(12) United States Patent
Conaway

(10) Patent No.: US 11,390,428 B2
(45) Date of Patent: Jul. 19, 2022

(54) USER-FRIENDLY TAMPER-RESISTANT/TAMPER-EVIDENT CONTAINER-SEAL SYSTEM FOR CONTAINERS OF CONSUMER GOODS AND METHODS OF USE

(71) Applicant: SealTech LLC, Indian Hills, CO (US)

(72) Inventor: Brian Jay Conaway, Indian Hills, CO (US)

(73) Assignee: SealTech LLC, Indian Hills, CO (US)

( * ) Notice: Subject to any disclaimer, the term of this patent is extended or adjusted under 35 U.S.C. 154(b) by 0 days.

(21) Appl. No.: 17/285,070

(22) PCT Filed: Feb. 28, 2020

(86) PCT No.: PCT/US2020/020482
§ 371 (c)(1),
(2) Date: Apr. 13, 2021

(87) PCT Pub. No.: WO2021/029912
PCT Pub. Date: Feb. 18, 2021

(65) Prior Publication Data
US 2022/0024645 A1  Jan. 27, 2022

Related U.S. Application Data

(60) Provisional application No. 62/886,267, filed on Aug. 13, 2019.

(51) Int. Cl.
*B65D 41/04* (2006.01)
*B32B 7/06* (2019.01)
(Continued)

(52) U.S. Cl.
CPC ............. *B65D 41/045* (2013.01); *B32B 7/06* (2013.01); *B32B 7/12* (2013.01); *B32B 27/08* (2013.01);
(Continued)

(58) Field of Classification Search
CPC .............. B65D 41/045; B65D 51/228; B65D 2251/0015; B65D 2251/0093;
(Continued)

(56) References Cited

U.S. PATENT DOCUMENTS 4,768,667 A     9/1988  Magnusson
5,197,618 A *   3/1993  Goth ...................... B65D 51/20
                                                  229/123.1

(Continued)

FOREIGN PATENT DOCUMENTS

JP           03176370         7/1991
JP         2016074439         5/2012
WO    WO-2018194300 A1 *   10/2018  ............. A45D 34/00

OTHER PUBLICATIONS

Translation of WO2018194300 from Espacenet. (Year: 2022).*
(Continued)

*Primary Examiner* — James N Smalley
(74) *Attorney, Agent, or Firm* — Startup IP Law, LLC; Terrence M. Wyles, Esq.

(57) ABSTRACT

The inventive disclosures described herein pertain to an improved tamper-resistant/tamper-evident (TE) seal for containers of consumer-product-containment vessels (such as, for example, prescription bottles, condiment bottles, etc.) that enables a user to better grip and/or exert force/leverage to more-easily and reliably open such containers. Specifically, it features an improved seal-removal assembly that provides a collapsible finger-receiving aperture that allows a user to insert at least one user finger (or an elongated tool, such as a writing utensil), and exert upward force to breach the container seal.

29 Claims, 15 Drawing Sheets

(51) Int. Cl.
  *B32B 7/12* (2006.01)
  *B32B 27/08* (2006.01)
  *B32B 27/36* (2006.01)
  *B65D 51/22* (2006.01)

(52) U.S. Cl.
  CPC ............ *B32B 27/36* (2013.01); *B65D 51/228* (2013.01); *B32B 2307/5825* (2013.01); *B32B 2307/748* (2013.01); *B32B 2435/02* (2013.01); *B65D 2251/0015* (2013.01); *B65D 2251/0093* (2013.01); *B65D 2251/0096* (2013.01); *B65D 2251/02* (2013.01); *B65D 2401/15* (2020.05); *B65D 2577/2058* (2013.01)

(58) Field of Classification Search
  CPC ........ B65D 2251/0096; B65D 2251/02; B65D 2401/15; B65D 2251/205; B32B 7/06; B32B 7/12; B32B 27/08; B32B 27/36; B32B 2307/5825; B32B 2307/748; B32B 2435/02
  USPC .... 220/359.2, 359.3, 212.5, 258.2; 215/305; 428/35.7, 35.9
  See application file for complete search history.

(56) References Cited

U.S. PATENT DOCUMENTS

| | | | |
|---|---|---|---|
| 7,757,879 B2 * | 7/2010 | Schuetz | B21D 51/44 |
| | | | 220/359.3 |
| 11,208,238 B2 * | 12/2021 | Conaway | B65D 51/228 |
| 2004/0026421 A1 * | 2/2004 | Holm | B65D 17/4011 |
| | | | 215/254 |
| 2006/0054584 A1 | 3/2006 | Jackman | |
| 2007/0003725 A1 * | 1/2007 | Yousif | B29C 66/80 |
| | | | 428/40.1 |
| 2010/0314278 A1 | 12/2010 | Fonteyne et al. | |
| 2020/0375339 A1 * | 12/2020 | Wei | A45D 34/00 |

OTHER PUBLICATIONS

International Search Report for PCT/US2020/020482 from KIPO International Searching Authority, dated Jun. 26, 2020 (3 pages).
Written Opinion from International Searching Authority for PCT/US2020/020482 from KIPO International Preliminary Examination Authority, dated Jun. 26, 2020 (4 pages).

* cited by examiner

USER-FRIENDLY TAMPER-RESISTANT/TAMPER-EVIDENT CONTAINER-SEAL SYSTEM FOR CONTAINERS OF CONSUMER GOODS AND METHODS OF USE

CROSS-REFERENCE TO RELATED APPLICATIONS

This patent application has common Inventorship with, and claims the priority benefit of, U.S. Patent Application No. 62/886,267, filed on Aug. 13, 2019 for "Improved User-Friendly Tamper-Resistant/Tamper-Evident Cap-Seal System for Containers of Consumer Goods and Methods of Use." Further, this patent application hereby incorporates by reference U.S. Patent Application No. 62/886,267 for all purposes. Should any irreconcilable conflicts arise between this patent application and the teachings of U.S. Patent Application No. 62/886,267 for purposes of claim construction/interpretation, then this patent application's teaching shall govern.

BACKGROUND

Containers of perishable and/or potentially hazardous consumer and commercial goods are commonly provided with tamper-resistant/tamper-evident seals to prevent inadvertent opening and to provide an indication to a user that a seal has already been breached. In typical containers of consumer and commercial goods (e.g., prescription medications), the tamper-resistant/tamper-evident container seal is often applied to the opening of a container using a removable or peelable seal, sealing member, or inner seal, with a cap or other closure then screwed or otherwise placed/attached over the container opening and encompassing the sealing member therein. In use, a consumer typically removes the cap or other closure to gain access to the sealing member and removes or otherwise peels the seal from the container in order to dispense or gain access to its contents. Initial attempts at sealing a container opening included an induction-type or conduction-type inner seal covering the container's opening where the seal is generally conformed to the shape of the opening (e.g., a circular container opening is sealed with a round disk approximately the same size and shape as the opening). These prior seals commonly have a lower heat-activated sealing layer to secure a periphery of the seal to a rim or other upper surface surrounding a container's opening. Upon exposing the seal to heat, the lower layer bonded to the container rim. In many cases, these seals included a foil layer capable of concentrating induction energy to activate the lower heat seal layer.

These prior-art seals tend to provide good sealing, but are often difficult to control in production, leading to little or no seal or to seals that are difficult for a consumer to remove because there is little or nothing for the consumer to grab onto in order to remove the seal. A typical type of container seal in the prior art includes a sealing member having a tab defined on the top of the seal. One common approach of these prior-art seals includes a partial layer coated with adhesive to secure the tab to a layer of metal foil. The tab is formed by a full layer extending across the entire surface of the sealing member, but the full layer is only bonded to part of the seal to form the tab. This type of top-tabbed seal offers a bit of a grasping area for the consumer to hold and peel off the seal. In other approaches, the seal may include a tab formed from the additional full layer of film combined with an additional full layer of adhesive utilizing a part paper or part polymer layer, called a tab stock, to form the tab. This part layer is inserted between the additional full layer of adhesive and lower seal portions to prevent the tab from sticking to the layers below, thus forming a small tab for a user to grip.

For solutions that include such very small, thin flexible tabs, some users, such as the elderly and/or those affirmed with arthritis in their hands, have a great deal of difficulty in accomplishing the task of gripping such small, thin, flexible tabs between their fingers and pulling-up with enough force to breach the container seal, before they lose their finger grip on the tab. Even if such users can eventually grip the very small, thin flexible tab, often the leverage available to the user is insufficient to easily open the container. One stop-gap solution is to reduce the induction or adhesive energy between the seal and the container in order to reduce the grip force required to open the container; however, this solution can result in poor-quality or incomplete sealing, leading to the contamination of the container contents and/or the lack of legally required tamper evidence.

There are other types of seals for containers used in the prior art, including those with a side tab or other flange that extends outwardly from a peripheral edge of the seal. These side tabs are generally not secured to the container rim and provide a grasping surface for a consumer to hold and peel off the seal. However, these side tabs extend over the side of the container rim and often protrude into a threaded portion of the closure. If the side tab is too large, this configuration may negatively affect the ability of the seal to form a good heat seal. The side tabs (and often the seal itself) can be deformed or wrinkled when the closure or other cap is placed on the container due to poor alignment between the closure (and threads thereof) and tabbed part of the seal. To minimize these concerns, such side tabs are often very small; thus, providing little surface area or material for a consumer to grasp in order to remove the seal.

What is needed is an improved means for elderly persons and those persons with medical conditions in their hands (e.g., limited finger-grip force and/or dexterity) that inhibit their ability to readily grip a small tab and open a sealed container.

BRIEF SUMMARY

The inventive disclosures described herein pertain to an improved tamper-resistant/tamper-evident (TE) seal for containers of consumer-product-containment vessels (such as, for example, prescription bottles, condiment bottles, etc.) that enables a user, and in particular older persons, to better grip and/or exert force/leverage to more-easily and reliably open such containers.

In one embodiment of the improved tamper-resistant seal, there are at least two flexible members between the inner seal and a substantially rigid upper layer such that a cavity is formed that a user's finger (or a rigid elongated tool, such as a pen, for example) can be inserted, which in turn enables a user to exert upward force and/or leverage against the container-opening rim in order to open the container without having to grip a thin flexible pull-tab member. In a variation, the two flexible members are affixed on a first end of the inner seal and are further joined together on a distal edge relative to the first end of the inner seal to form a cavity adapted to receive a user's finger (or a rigid elongated tool, such as a pen, for example), which in turn enables a user to exert upward force to open the container without having to grip a thin flexible pull-tab member; however, in such a variation, there is no substantially rigid upper layer that is attached to the two flexible members. Each of these embodiments are generally referred to as a "finger-loop" type tamper-resistant seal.

The foregoing Brief Summary is intended to merely provide a short, general overview of the inventive disclosure described throughout this patent application, and therefore, is not intended to limit the scope of the inventive disclosure contained throughout the balance of this patent application, including any appended claims and drawings.

BRIEF DESCRIPTION OF THE DRAWINGS

FIG. 1A depicts one embodiment of the side cross-sectional view of the layers/substrates used for an improved "finger-loop" type tamper-resistant seal, showing typical prior-art substrates that would normally be disposed in a container cap and typical prior-art sealing substrates that are normally disposed at the very top of the container to be sealed, with the improved "finger-loop" type tamper-resistant seal disposed in between.

FIG. 1C depicts one embodiment of the side cross-sectional view of the layers/substrates used for an improved "finger-loop" type tamper-resistant seal, showing typical prior-art substrates disposed in a container cap installed on the container, and showing a typical prior-art sealing substrate disposed at the very top of the container, wherein the improved "finger-loop" type tamper-resistant seal is shown disposed in between.

FIG. 2A depicts one alternative embodiment of the side cross-sectional view of the layers/substrates used for an improved "finger-loop" type tamper-resistant seal, showing typical prior-art substrates that would normally be disposed in a container cap and typical prior-art sealing substrates that are normally disposed at the very top of the container to be sealed, with the improved "finger-loop" type tamper-resistant seal disposed in between.

FIG. 2C depicts one alternative embodiment of the side cross-sectional view of the layers/substrates used for an improved "finger-loop" type tamper-resistant seal, showing typical prior-art substrates disposed in a container cap installed on the container, and showing a typical prior-art sealing substrate disposed at the very top of the container, wherein the improved "finger-loop" type tamper-resistant seal is shown disposed in between.

FIG. 7A depicts a sixth alternative embodiment of the side cross-sectional view of the layers/substrates used for an improved "finger-loop" type tamper-resistant seal, showing typical prior-art substrates that would normally be disposed in a container cap and typical prior-art sealing substrates that are normally disposed at the very top of the container to be sealed, with the improved "finger-loop" type tamper-resistant seal disposed in between.

FIG. 7C depicts a sixth alternative embodiment of the side cross-sectional view of the layers/substrates used for an improved "finger-loop" type tamper-resistant seal, showing typical prior-art substrates disposed in a container cap installed on the container, and showing a typical prior-art sealing substrate disposed at the very top of the container, wherein the improved "finger-loop" type tamper-resistant seal is shown disposed in between.

FIG. 8A depicts a seventh alternative embodiment of the side cross-sectional view of the layers/substrates used for an improved "finger-loop" type tamper-resistant seal, showing typical prior-art substrates that would normally be disposed in a container cap and typical prior-art sealing substrates that are normally disposed at the very top of the container to be sealed, with the improved "finger-loop" type tamper-resistant seal disposed in between.

FIG. 8C depicts a seventh alternative embodiment of the side cross-sectional view of the layers/substrates used for an improved "finger-loop" type tamper-resistant seal, showing typical prior-art substrates disposed in a container cap installed on the container, and showing a typical prior-art sealing substrate disposed at the very top of the container, wherein the improved "finger-loop" type tamper-resistant seal is shown disposed in between.

DETAILED DESCRIPTION

I. Overview

Figure 1A:
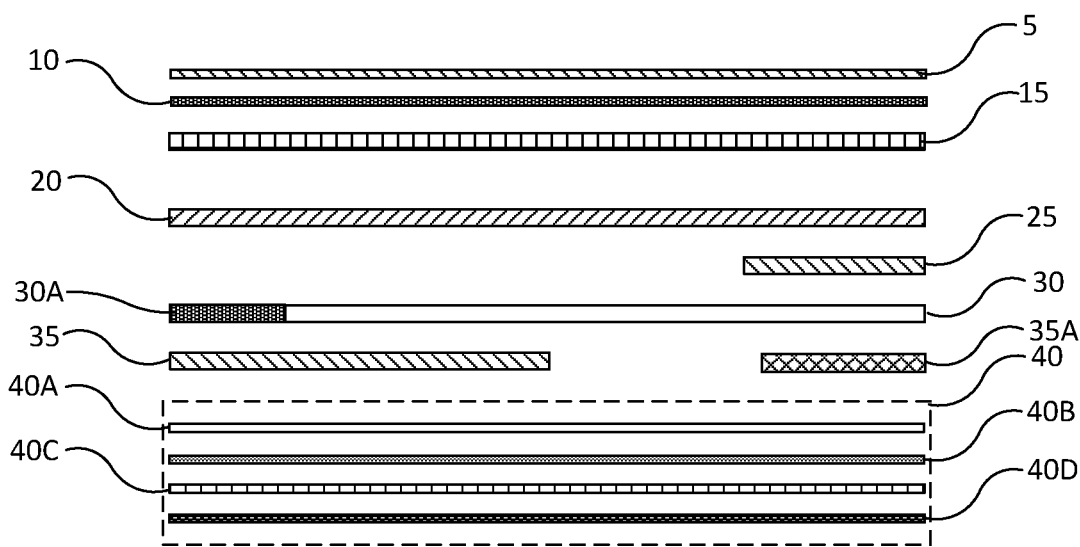
Figure 1B:
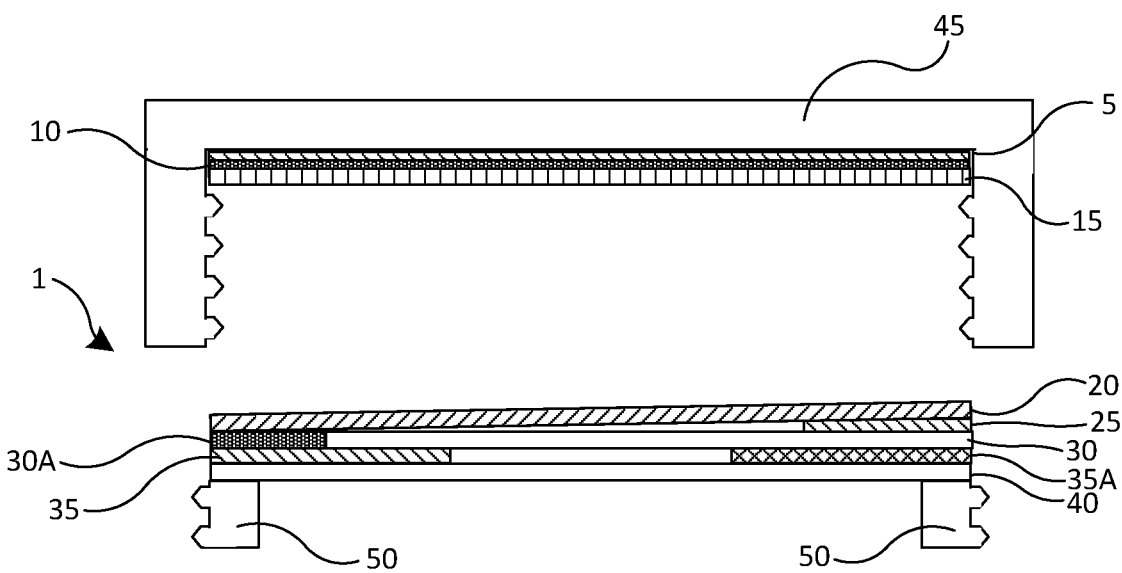
FIG. 1B depicts one embodiment of the side cross-sectional view of the layers/substrates used for an improved "finger-loop" type tamper-resistant seal, showing typical prior-art substrates disposed in a container cap separated from the container, and showing a typical prior-art sealing substrate disposed at the very top of the container, wherein the improved "finger-loop" type tamper-resistant seal is shown disposed in between in a compressed state.
Figure 1C:
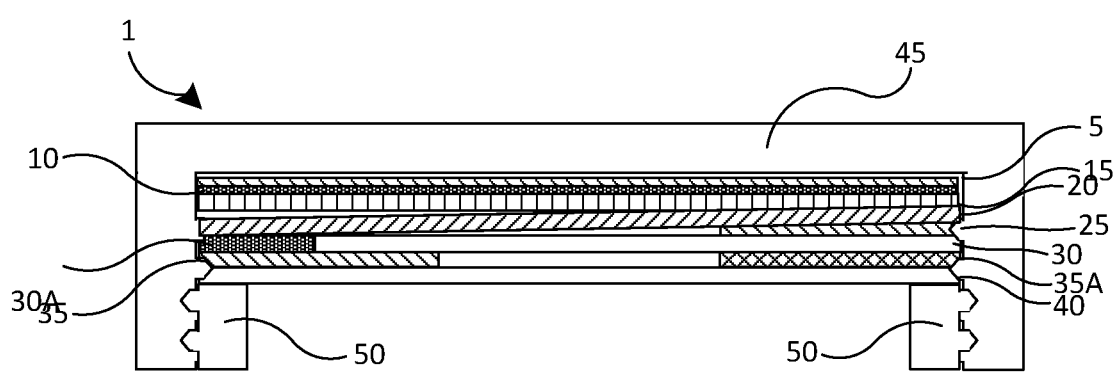
Figure 1D:
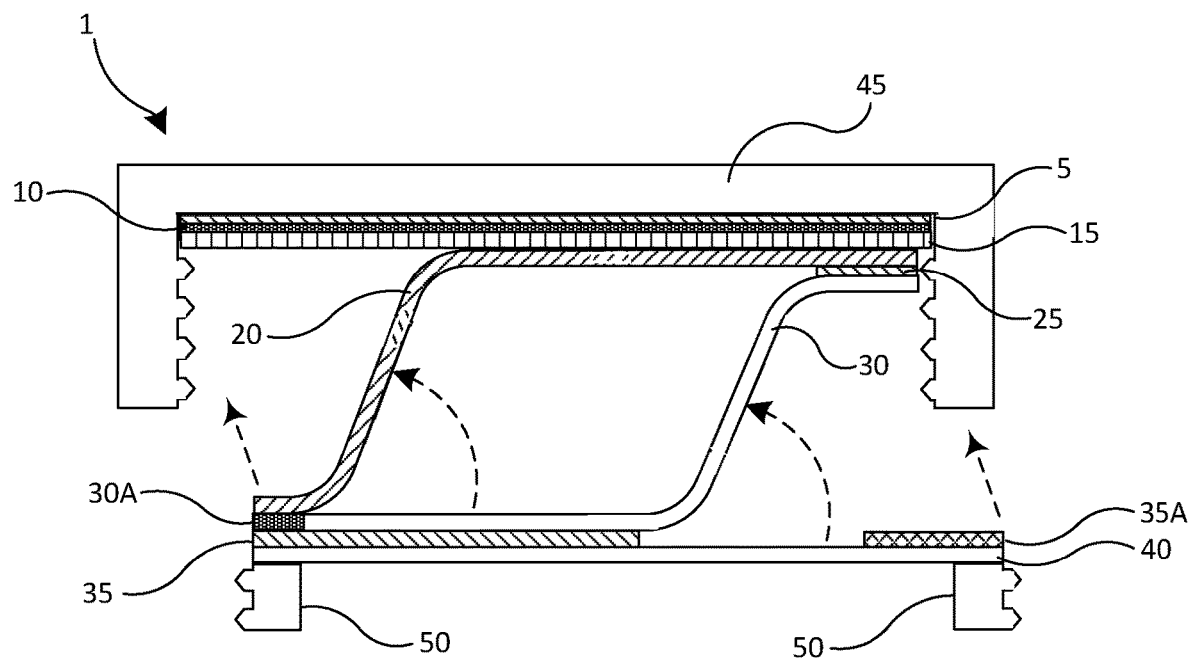
FIG. 1D depicts one embodiment of the side cross-sectional view of the layers/substrates used for an improved "finger-loop" type tamper-resistant seal, showing typical prior-art substrates disposed in a container cap separated from the container, and showing a typical prior-art sealing substrate disposed at the very top of the container, wherein the improved "finger-loop" type tamper-resistant seal is shown disposed in between while still attached to the cap and in a partially expanded state as the cap is removed from the container.
Figure 1E:
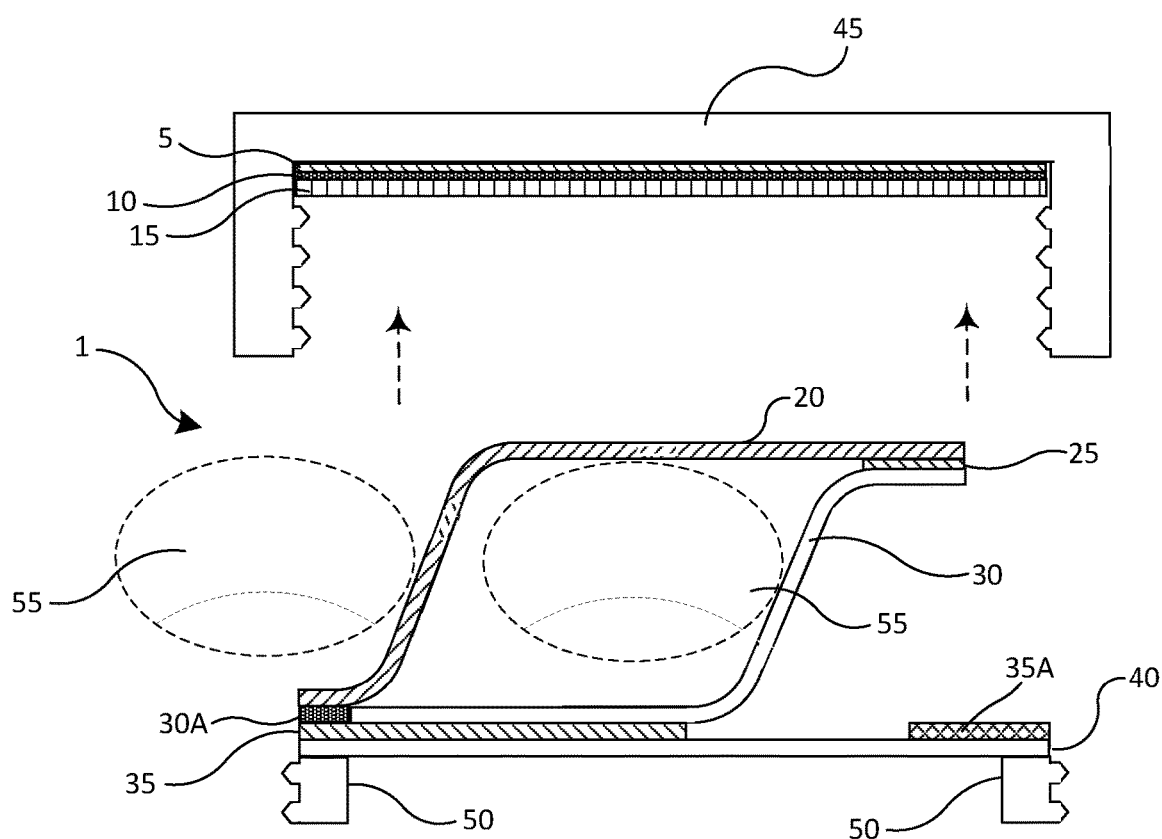
FIG. 1E depicts one embodiment of the side cross-sectional view of the layers/substrates used for an improved "finger-loop" type tamper-resistant seal, showing typical prior-art substrates disposed in a container cap separated from the container, and showing a typical prior-art sealing substrate disposed at the very top of the container, wherein the improved "finger-loop" type tamper-resistant seal is shown disposed in a completely expanded state while detached from the cap and said "finger loop" being engaged by at least one user finger (an end view of said finger) so a user can exert upper force to detach the seal from the container.
Figure 2A:
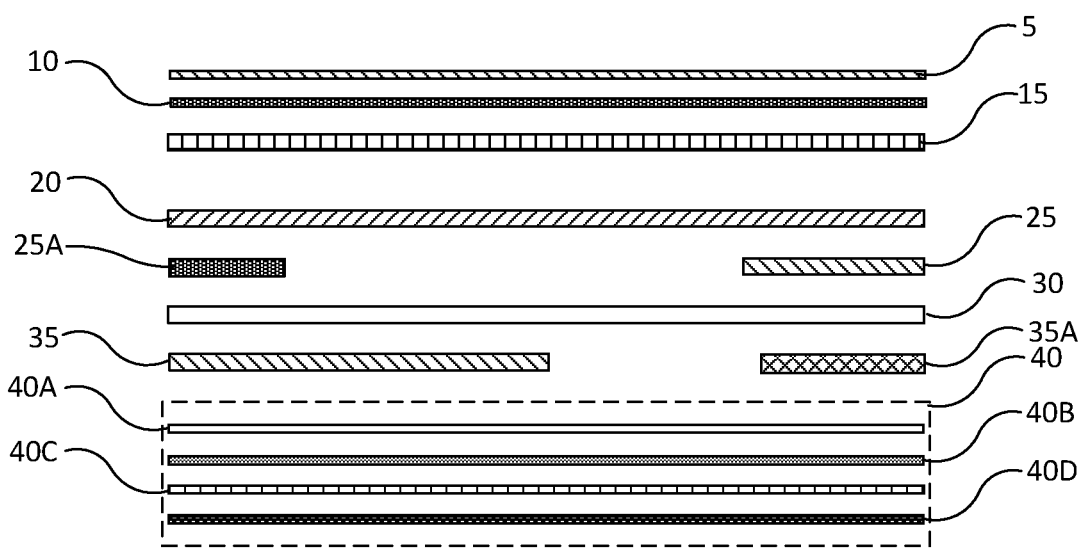
Figure 2B:
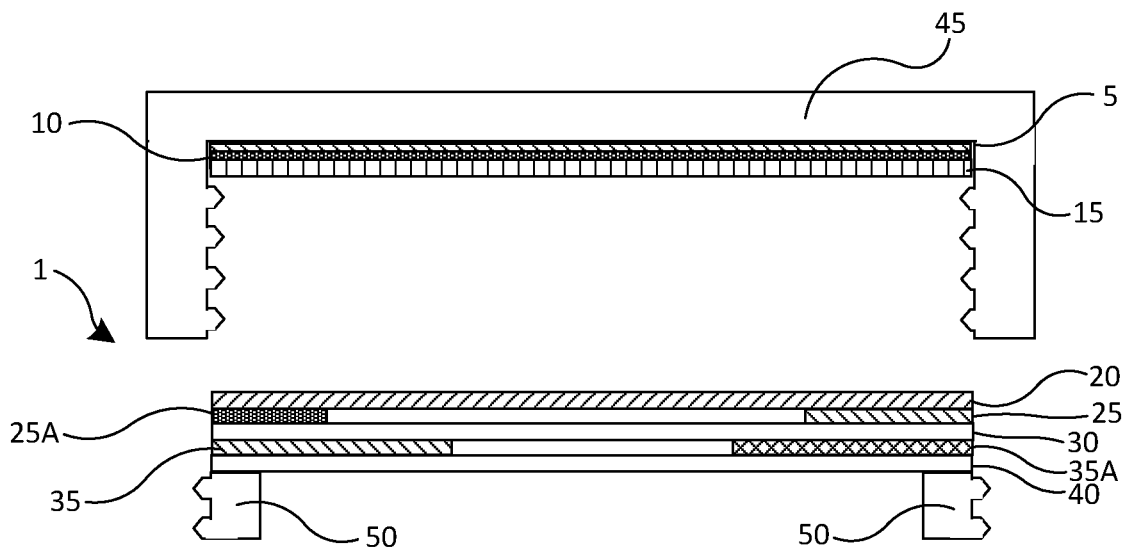
FIG. 2B depicts one alternative embodiment of the side cross-sectional view of the layers/substrates used for an improved "finger-loop" type tamper-resistant seal, showing typical prior-art substrates disposed in a container cap separated from the container, and showing a typical prior-art sealing substrate disposed at the very top of the container, wherein the improved "finger-loop" type tamper-resistant seal is shown disposed in between in a compressed state.
Figure 2C:
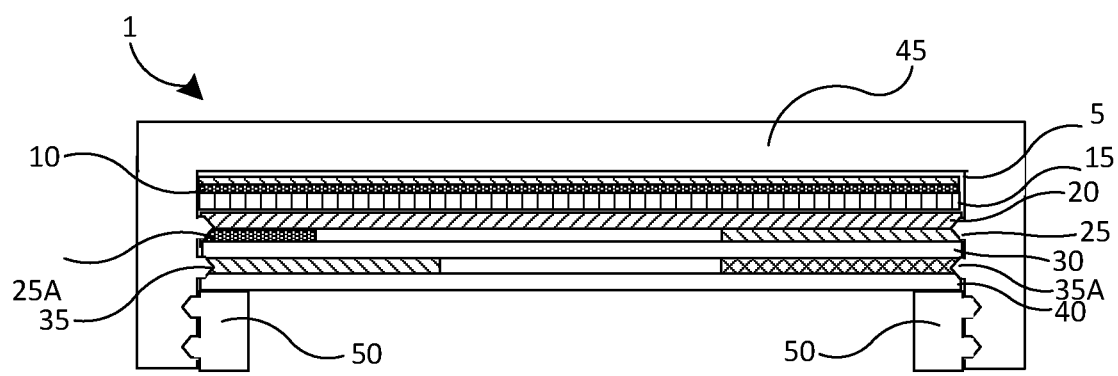
Figure 2D:
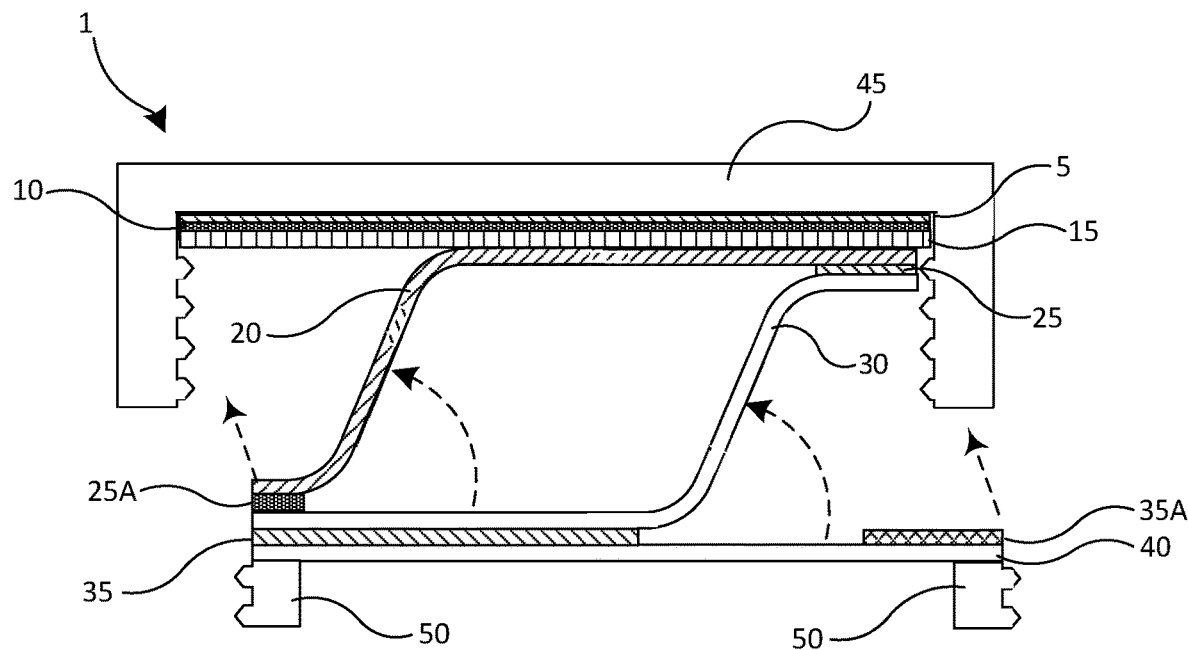
FIG. 2D depicts one alternative embodiment of the side cross-sectional view of the layers/substrates used for an improved "finger-loop" type tamper-resistant seal, showing typical prior-art substrates disposed in a container cap separated from the container, and showing a typical prior-art sealing substrate disposed at the very top of the container, wherein the improved "finger-loop" type tamper-resistant seal is shown disposed in between while still attached to the cap and in a partially expanded state as the cap is removed from the container.
Figure 2E:
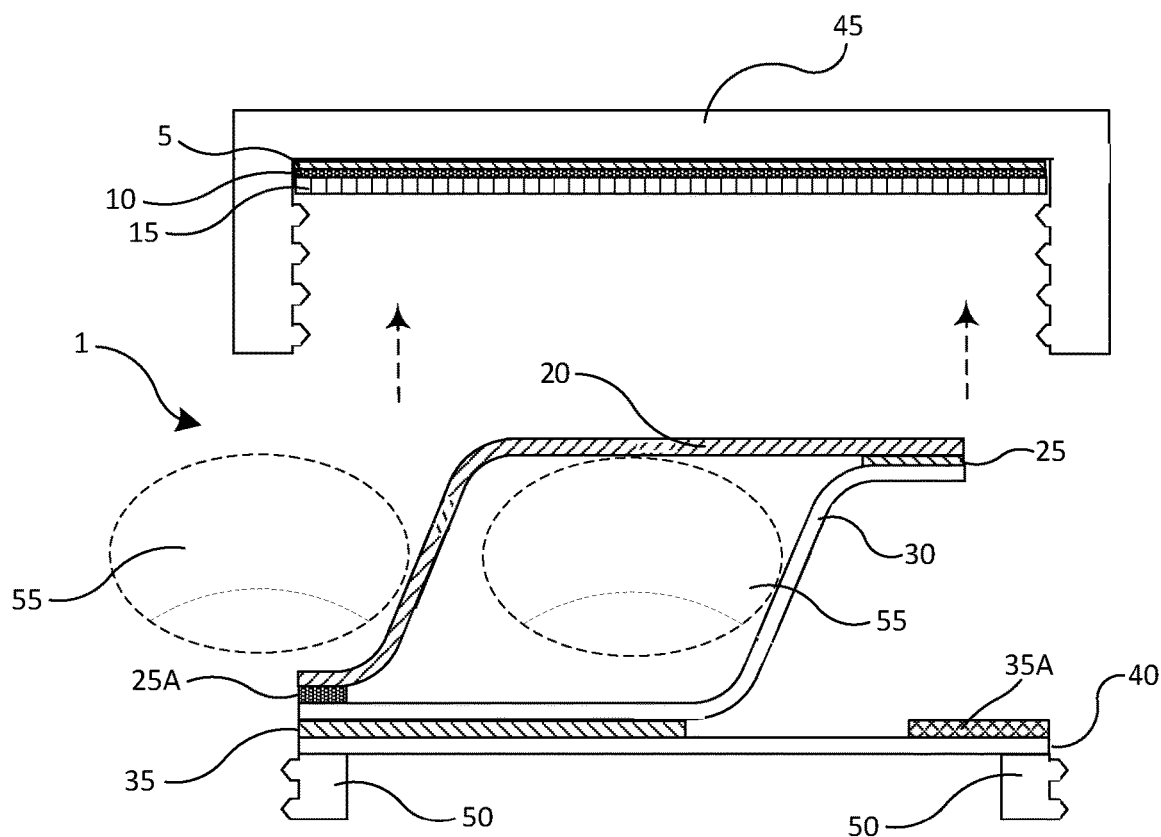
FIG. 2E depicts one alternative embodiment of the side cross-sectional view of the layers/substrates used for an improved "finger-loop" type tamper-resistant seal, showing typical prior-art substrates disposed in a container cap separated from the container, and showing a typical prior-art sealing substrate disposed at the very top of the container, wherein the improved "finger-loop" type tamper-resistant seal is shown disposed in a completely expanded state while detached from the cap and said "finger loop" being engaged by at least one user finger (an end view of said finger) so a user can exert upper force to detach the seal from the container.
Figure 3A:
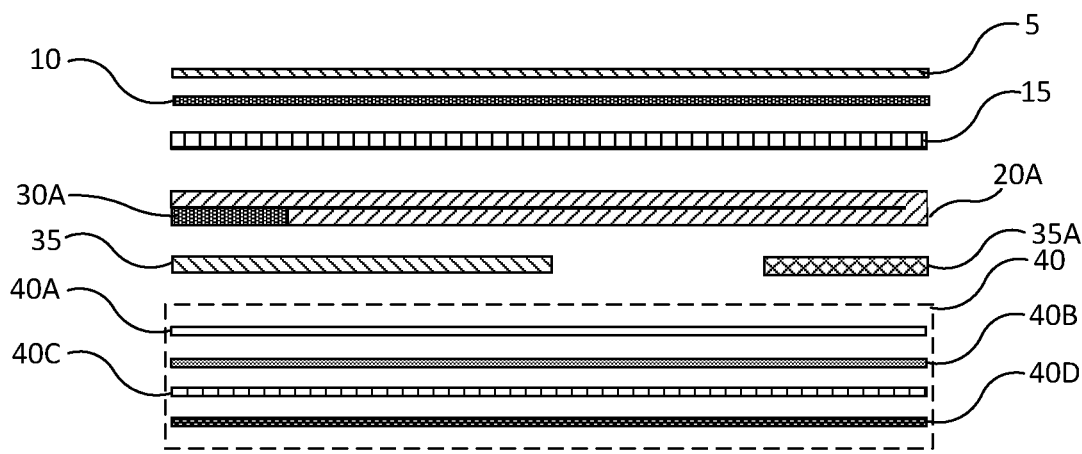
FIG. 3A depicts a second alternative embodiment of the side cross-sectional view of the layers/substrates used for an improved "finger-loop" type tamper-resistant seal, showing typical prior-art substrates that would normally be disposed in a container cap and typical prior-art sealing substrates that are normally disposed at the very top of the container to be sealed, with the improved "finger-loop" type tamper-resistant seal disposed in between. This embodiment employs a single folded-over substrate to form the "finger loop."
Figure 3B:
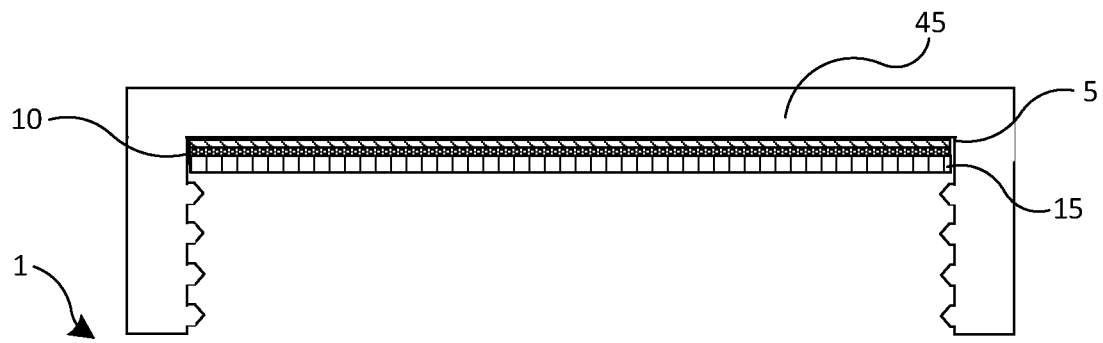
FIG. 3B depicts a second alternative embodiment of the side cross-sectional view of the layers/substrates used for an improved "finger-loop" type tamper-resistant seal, showing typical prior-art substrates disposed in a container cap separated from the container, and showing a typical prior-art sealing substrate disposed at the very top of the container, wherein the improved "finger-loop" type tamper-resistant seal is shown disposed in between in a compressed state. This embodiment employs a single folded-over substrate to form the "finger loop."
Figure 3C:
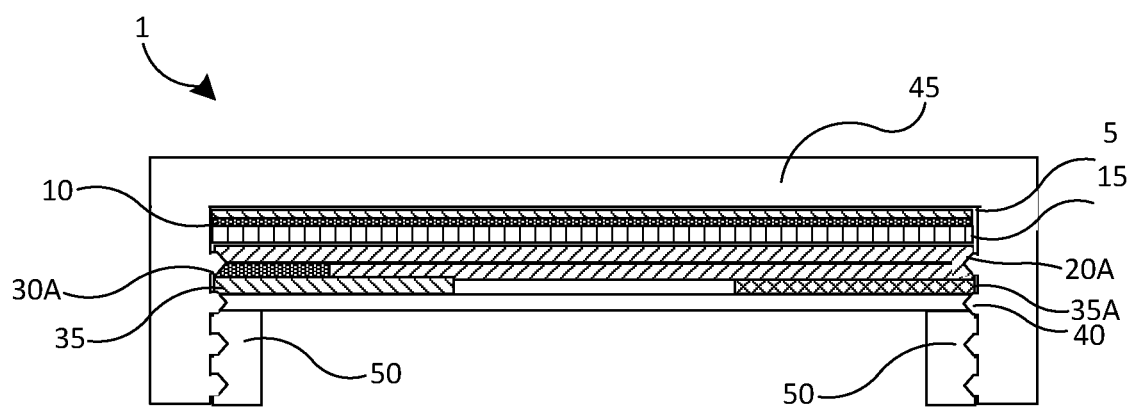
FIG. 3C depicts a second alternative embodiment of the side cross-sectional view of the layers/substrates used for an improved "finger-loop" type tamper-resistant seal, showing typical prior-art substrates disposed in a container cap installed on the container, and showing a typical prior-art sealing substrate disposed at the very top of the container, wherein the improved "finger-loop" type tamper-resistant seal is shown disposed in between. This embodiment employs a single folded-over substrate to form the "finger loop."
Figure 3D:
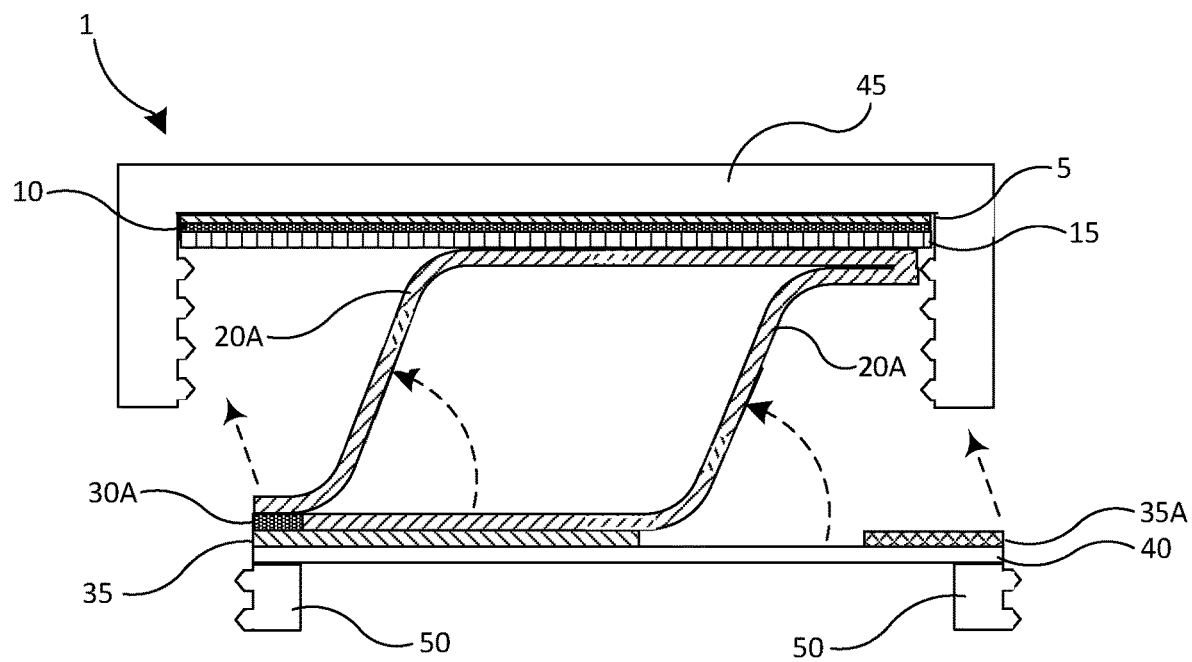
FIG. 3D depicts a second alternative embodiment of the side cross-sectional view of the layers/substrates used for an improved "finger-loop" type tamper-resistant seal, showing typical prior-art substrates disposed in a container cap separated from the container, and showing a typical prior-art sealing substrate disposed at the very top of the container, wherein the improved "finger-loop" type tamper-resistant seal is shown disposed in between while still attached to the cap and in a partially expanded state as the cap is removed from the container. This embodiment employs a single folded-over substrate to form the "finger loop."
Figure 3E:
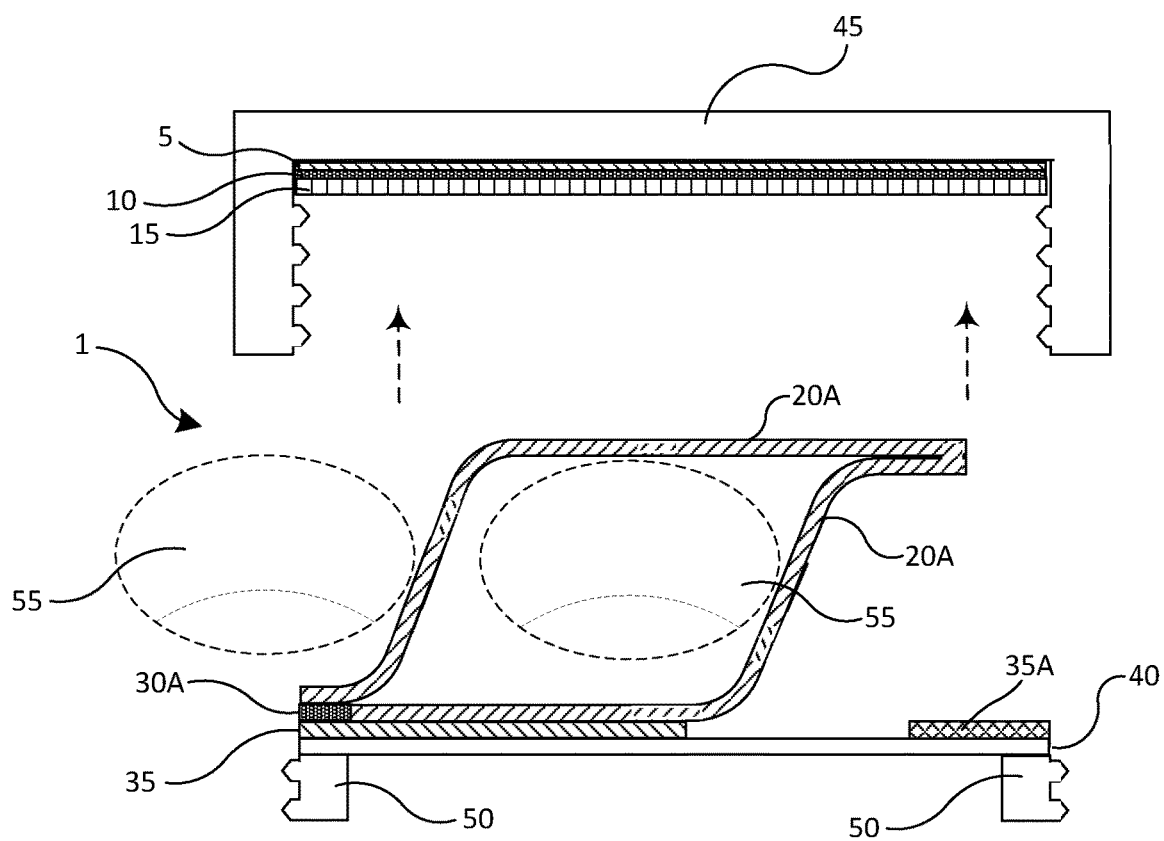
FIG. 3E depicts a second alternative embodiment of the side cross-sectional view of the layers/substrates used for an improved "finger-loop" type tamper-resistant seal, showing typical prior-art substrates disposed in a container cap separated from the container, and showing a typical prior-art sealing substrate disposed at the very top of the container, wherein the improved "finger-loop" type tamper-resistant seal is shown disposed in a completely expanded state while detached from the cap and said "finger loop" being engaged by at least one user finger (an end view of said finger) so a user can exert upper force to detach the seal from the container. This embodiment employs a single folded-over substrate to form the "finger loop."

The inventive disclosures described herein pertain to an improved tamper-resistant/tamper-evident (TE) seal for containers of consumer-product-containment vessels (such as, for example, prescription bottles, condiment bottles, etc.) that enables a user, and in particular older persons, to better grip and/or exert force/leverage to more-easily and reliably open such containers. In one embodiment of the improved tamper-resistant seal, there are at least two flexible members between the inner seal and a substantially rigid upper layer such that a cavity (or through hole) is formed that a user's finger (or a rigid elongated tool, such as a pen, for example) can be inserted, which in turn enables a user to generally exert upward force to open the container without having to grip a thin flexible pull-tab member. In a variation, the two flexible members are affixed on a first end of the inner seal and are further joined together on a distal edge relative to the first end of the inner seal to form a cavity adapted to receive a user's finger (or a rigid elongated tool, such as a pen, for example), which in turn enables a user to exert upward force to open the container without having to grip a thin flexible pull-tab member; however, in such a variation, there is no substantially rigid upper layer that is attached to the two flexible members. Each of these embodiments are generally referred to as a "finger-loop" type tamper-resistant seal.

II. Terminology

The terms and phrases as indicated in quotes (" ") in this Section are intended to have the meaning ascribed to them in this Terminology Section applied to them throughout this document, including the claims, unless clearly indicated otherwise in context. Further, as applicable, the stated definitions are to apply, regardless of the word or phrase's case, to the singular and plural variations of the defined word or phrase.

The term "or", as used in this specification, drawings, and any appended claims, is not meant to be exclusive; rather, the term is inclusive, meaning "either or both".

References in the specification to "one embodiment", "an embodiment", "a preferred embodiment", "an alternative embodiment", "a variation", "one variation", and similar phrases mean that a particular feature, structure, or characteristic described in connection with the embodiment is included in at least an embodiment of the invention. The appearances of the phrase "in one embodiment" and/or "in one variation" and similar phrases in various places in the specification are not necessarily all meant to refer to the same embodiment.

The term "couple" or "coupled", as used in this specification, drawings, and any appended claims, refers to either an indirect or a direct connection between the identified elements, components, or objects. Often, the manner of the coupling is related specifically to the manner in which the two coupled elements interact.

The term "removable", "removably coupled", "readily removable", "readily detachable", "detachably coupled", and similar terms, as used in this specification, drawings, and any appended claims, refer to structures that can be uncoupled from an adjoining structure with relative ease (i.e., non-destructively and without a complicated or time-consuming process) and that can also be readily reattached or coupled to the previously adjoining structure.

Directional and/or relational terms such as, but not limited to, left, right, nadir, apex, top, bottom, vertical, horizontal, back, front, lateral, proximal, and distal are relative to each other, are dependent on the specific orientation of an applicable element or article, are used accordingly to aid in the description of the various embodiments, and are not necessarily intended to be construed as limiting in this specification, drawings, and any appended claims.

As applicable, the terms "about", "approximately", or "generally", as used herein unless otherwise indicated, means a margin of +−20%. Also, as applicable, the term "substantially" as used herein unless otherwise indicated means a margin of +−10%. It is to be appreciated that not all uses of the above terms are quantifiable such that the referenced ranges can be applied.

III. An Improved User-Friendly Tamper-Resistant/Tamper-Evident Container-Seal System for Consumer Goods This Section III is directed generally to an improved tamper-resistant/tamper-evident (TE) seal for containers of consumer-product-containment vessels (such as, for example, prescription bottles, condiment bottles, etc.) that enables a user, and in particular older persons, to better grip and/or exert leverage/upward force to more-easily and reliably open such containers. Refer to FIGS. 1A-1E, 2A-2E, 3A-3E, 4A-4E, 5A-5B, 6A-6B, 7A-7E, 8A-8E, and 9A-9H. In an embodiment, of the improved tamper-resistant seal 1, a typical prior-art seal configuration 40 (including 40A, 40B, 40C, and 40D) is improved by affixing at least two flexible members 20, 30 a first end of the inner seal 40 and are further joined together on a distal edge relative to the first end of the inner seal 40 to form a cavity (or through-hole) adapted to receive at least one user finger 55 (or a rigid elongated tool, such as a pen, for example), which in turn enables a user to generally exert upward force to open the container without having to grip a thin flexible pull-tab member, as is the case in a typical prior-art TE seal. Hereinafter, this cavity is referred to as a "collapsible finger-receiving aperture" or as a finger-receiving-aperture sleeve." Each of these types of embodiments is generally referred to as a "finger-loop" type tamper-resistant seal.

In many embodiments, the overall seal system is comprised of the following layers/structures, some of which are typically found in the prior art, as described below:

First, the actual induction-layer, tamper-evident container seal 40 (already known in the art) that is intended to be breached to access the contained goods within the container 50 (with the container typically made of plastic, polypropylene, polyethylene, metal, or glass) typically, but not necessarily, comprises four substrates that include a non-foam heat-distribution sheet 40A (typically made from polyolefin materials such as polyethylene, polypropylene, or a blend thereof), an induction-heat-activated metal-foil layer 40B (typically made from aluminum foil, other metal foils, or metal-impregnated materials) with an optional adhesive layer (typically comprised of two-part polyurethane, ethylene vinyl acetate [EVA], or ethyl methactylate [EMA]), a lower polymer sheet/film 40C (typically made from polyester film, nylon, polyethylene naphthalate [PEN], and/or polypropylene), and a heat-activated adhesive sealant layer sheet 40D (typically made from EVA, ethylene-acrylic acid copolymer, or an ionomer resin such as, for example, Surlyn®). Of course, those skilled in the art will readily recognize that the composition of the container seal 40 can vary with other seal constructs known in the art without any effect on the inventive disclosures described herein.

Second, within the container cap 45 (typically made of plastic, polypropylene, polyethylene, or metal), and as is typical in the prior art, there is an upper composite layer typically comprised of (1) an upper cap-retention sheet (also called a cap liner and compressing layer) 10 (typically made of fiber, pulp, chipboard, polymer, foam, or other compressible material), which in variations may be adhesively affixed to the container cap 45 (via an adhesive layer 5 typically being a of hot-melt, room-temperature-vulcanizing [RTV], or solvent-based adhesive), and/or affixed to/in the container cap 45 via interference fit; and (2) a heat-activated release layer 15 (typically made from wax or other heat-activated release material) to further hold this assembly in place. In some prior-art applications, one or more additional support/protection layers (not shown) are also used with in the container cap 45, which are typically made from polyester film, nylon, polyethylene naphthalate (PEN), polypropylene, or other tear-resistant material, and those support/protection layers may be further supported with an adhesive layer (not shown) such as EVA or EMA and another bonding layer (not shown) typically made from paper, polyester film, nylon, PEN, and/or polypropylene. Of course, those skilled in the art will readily recognize that the container cap 45 and the composition of the cap-retention layers 5, 10, 15 can vary with other container caps and cap-retention layers known in the art without any effect on the inventive disclosures described herein.

Third, situated between the container-cap layers 5, 10, 15 and the actual container seal 40, is the improved seal-removal assembly 1. The main improvement on this tamper-resistant/tamper-evident container-seal-opening schema, and specifically improved seal-removal assembly 1, as detailed in several embodiments discussed below, is the formation of a collapsible finger-receiving-aperture sleeve (once the improved seal-removal assembly 1 is extended) for receiving an inserted user finger 55 or other user-selected elongated tool, such a writing utensil, such that a user can more-easily exert upward force to peel-away the container seal 40 from its container 50.

In some embodiments, referring to FIGS. 1A through 1E, the improved seal-removal assembly 1 is comprised of a first adhesive layer 35 disposed between the container seal 40 and a flexible bottom sheet 30 and/or an adhesive member 30A disposed adjacent to the flexible bottom sheet 30. The first adhesive layer 35 is typically disposed on a first end of the container seal 40 and flexible bottom sheet 30 (and/or adhesive member 30A), typically covering between a third and a half of the length of the container seal 40, such that when the flexible bottom sheet 30 is pulled upward, it can exert upward force on a portion of the container seal 40 so as to peel-away the container seal 40 and open the container 50. A second flexible sheet 20 is coupled on one of its ends via adhesive and/or heat-sealing to the first end of the flexible bottom sheet 30 and/or adhesive member 30A, and the second flexible sheet 20 is coupled on its opposite end to a second end of the flexible bottom sheet 30 via an adhesive layer 25, leaving the region between the two couplings free to open-up when the two flexible sheets 20, 30 are raised such that a collapsible finger-receiving-aperture sleeve is formed that can receive a user finger 55 and/or an elongated tool (e.g., a writing utensil such as a pen). In an optional variation, an additional temporary adhesive layer 35A is provided to be disposed between the second end of the flexible bottom sheet 30 and the second end of the container seal 40, wherein the additional temporary adhesive layer 35A aids in the fabrication/manufacturing process as the improved seal-removal assembly 1 is compressed between the container's 50 seal 40 and the container cap 45.

In other embodiments, referring to FIGS. 2A through 2E, the improved seal-removal assembly 1 is comprised of a first adhesive layer 35 disposed between the container seal 40 and a flexible bottom sheet 30. The first adhesive layer 35 is typically disposed on a first end of the container seal 40 and flexible bottom sheet 30, typically covering between a third and a half of the length of the container seal 40, such that when the flexible bottom sheet 30 is pulled upward, it can exert upward force on a portion of the container seal 40 so as to peel-away the container seal 40 and open the container 50. A second flexible sheet 20 is coupled on one of its ends via an adhesive layer 25A to the first end of the flexible bottom sheet 30, and the second flexible sheet 20 is coupled on its opposite end to a second end of the flexible bottom sheet 30 via an adhesive layer 25, leaving the region between the two couplings free to open-up when the two flexible sheets 20, 30 are raised such that a collapsible finger-receiving-aperture sleeve is formed that can receive a user finger 55 and/or an elongated tool (e.g., a writing utensil such as a pen). In an optional variation, an additional temporary adhesive layer 35A is provided to be disposed between the second end of the flexible bottom sheet 30 and the second end of the container seal 40, wherein the additional temporary adhesive layer 35A aids in the fabrication/manufacturing process as the improved seal-removal assembly 1 is compressed between the container's 50 seal 40 and the container cap 45.

In additional embodiments, referring to FIGS. 3A through 3E, the improved seal-removal assembly 1 is comprised of a first adhesive layer 35 disposed between the container seal 40 and a single flexible sheet 20A of a length that is about twice the length or width of the container seal 40, wherein the single flexible sheet 20A, having a first end and a second end, is folded over itself when the improved seal-removal assembly 1 is in a compressed/stored state. The first adhesive layer 35 is typically disposed on a first end of the container seal 40 and single flexible sheet 20A, typically covering between a third and a half of the length of the container seal 40. In addition, a short adhesive layer 30A is typically disposed on the first adhesive layer 35, and between the two ends of the single flexible sheet 20A. When the single flexible sheet 20A is pulled upward, a region is opened up (that is, a collapsible finger-receiving-aperture sleeve) within the single flexible sheet 20A such that a user finger 55 and/or an elongated tool (e.g., a writing utensil such as a pen) can be inserted into the collapsible finger-receiving-aperture sleeve and upward force can be exerted by the user to breach the container seal 40 to open the container 50. In an optional variation, an additional temporary adhesive layer 35A is provided to be disposed between the part of the single flexible sheet 20A and the second end of the container seal 40, wherein the additional temporary adhesive layer 35A aids in the fabrication/manufacturing process as the improved seal-removal assembly 1 is compressed between the container's 50 seal 40 and the container cap 45.

In even more embodiments, referring to FIGS. 4A through 4E, the improved seal-removal assembly 1 has an added user-grip tab 60A to aid in a user in pulling-up/expanding the improved seal-removal assembly 1. Specifically, a flexible tab sheet 60A is disposed on the top surface of the flexible sheet 20 via an adhesive layer 65. When the container cap 45 is removed from the container 50, the user-grip tab 60A is exposed (so it can be gripped with a user's thumb 55A and finger 55) and a user can pull it upward to expand the finer-receiving aperture (formed by the flexible bottom sheet 30 and the second flexible sheet 20). FIGS. 4A through 4E are largely identical to FIGS. 2A through 2E, with the exception of the addition of the user-grip tab 60A and its associated adhesive layer 65, and it provided for as an example of the application f the added user grip tab 60A; however, the added user-grip tab 60A can be applied to any of the other embodiments described herein.

Figure 4A:
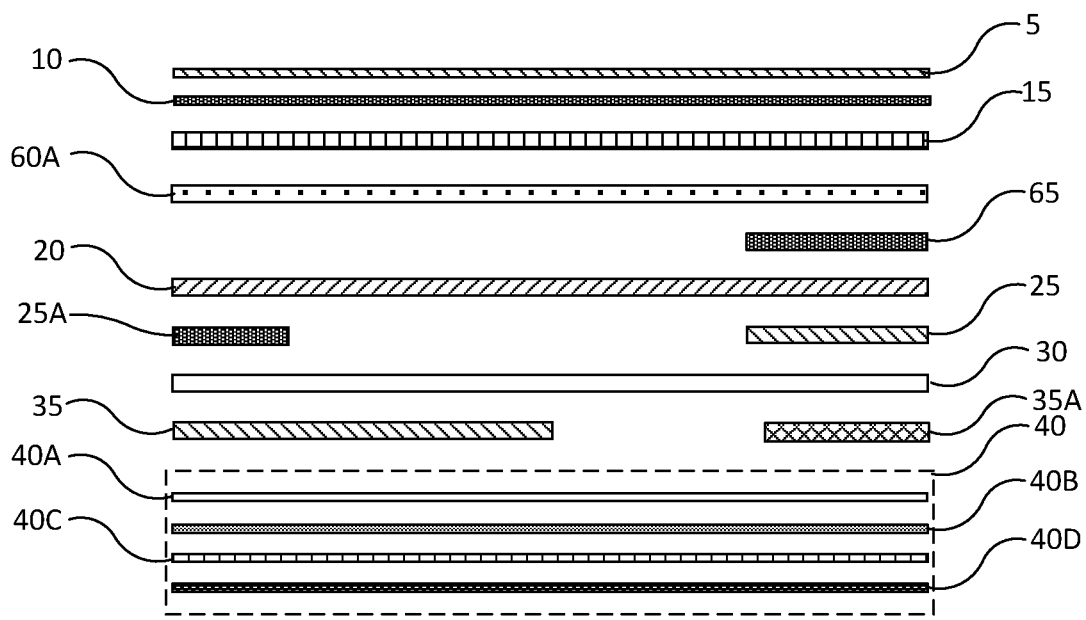
FIG. 4A depicts a third alternative embodiment of the side cross-sectional view of the layers/substrates used for an improved "finger-loop" type tamper-resistant seal, showing typical prior-art substrates that would normally be disposed in a container cap and typical prior-art sealing substrates that are normally disposed at the very top of the container to be sealed, with the improved "finger-loop" type tamper-resistant seal disposed in between. This embodiment features an additional upper tab member to aid a user to expand and open-up the "finger loop."
Figure 4B:
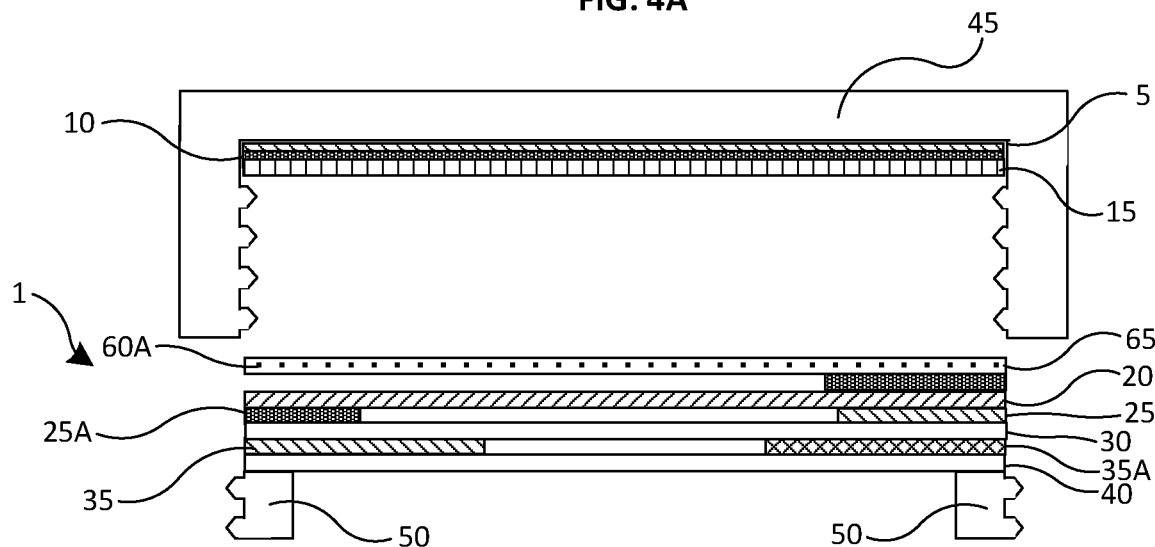
FIG. 4B depicts a third alternative embodiment of the side cross-sectional view of the layers/substrates used for an improved "finger-loop" type tamper-resistant seal, showing typical prior-art substrates disposed in a container cap separated from the container, and showing a typical prior-art sealing substrate disposed at the very top of the container, wherein the improved "finger-loop" type tamper-resistant seal is shown disposed in between in a compressed state. This embodiment features an additional upper tab member to aid a user to expand and open-up the "finger loop."
Figure 4C:
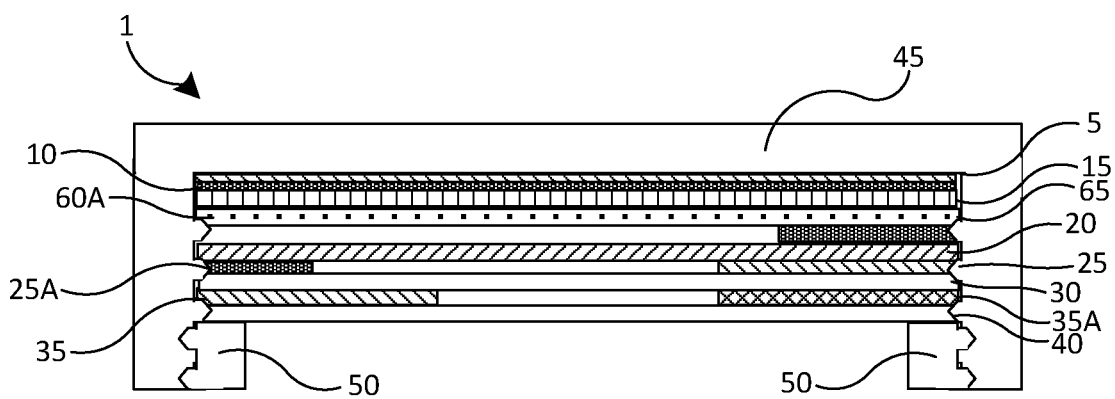
FIG. 4C depicts a third alternative embodiment of the side cross-sectional view of the layers/substrates used for an improved "finger-loop" type tamper-resistant seal, showing typical prior-art substrates disposed in a container cap installed on the container, and showing a typical prior-art sealing substrate disposed at the very top of the container, wherein the improved "finger-loop" type tamper-resistant seal is shown disposed in between. This embodiment features an additional upper tab member to aid a user to expand and open-up the "finger loop."
Figure 4D:
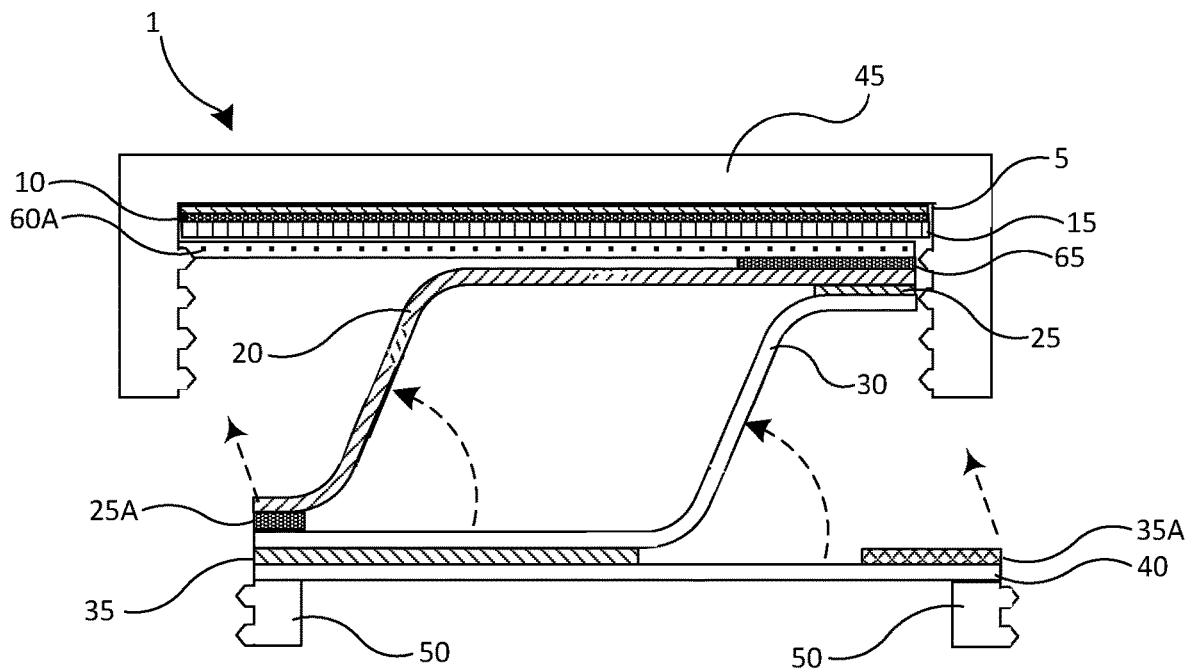
FIG. 4D depicts a third alternative embodiment of the side cross-sectional view of the layers/substrates used for an improved "finger-loop" type tamper-resistant seal, showing typical prior-art substrates disposed in a container cap separated from the container, and showing a typical prior-art sealing substrate disposed at the very top of the container, wherein the improved "finger-loop" type tamper-resistant seal is shown disposed in between while still attached to the cap and in a partially expanded state as the cap is removed from the container. This embodiment features an additional upper tab member to aid a user to expand and open-up the "finger loop."
Figure 4E:
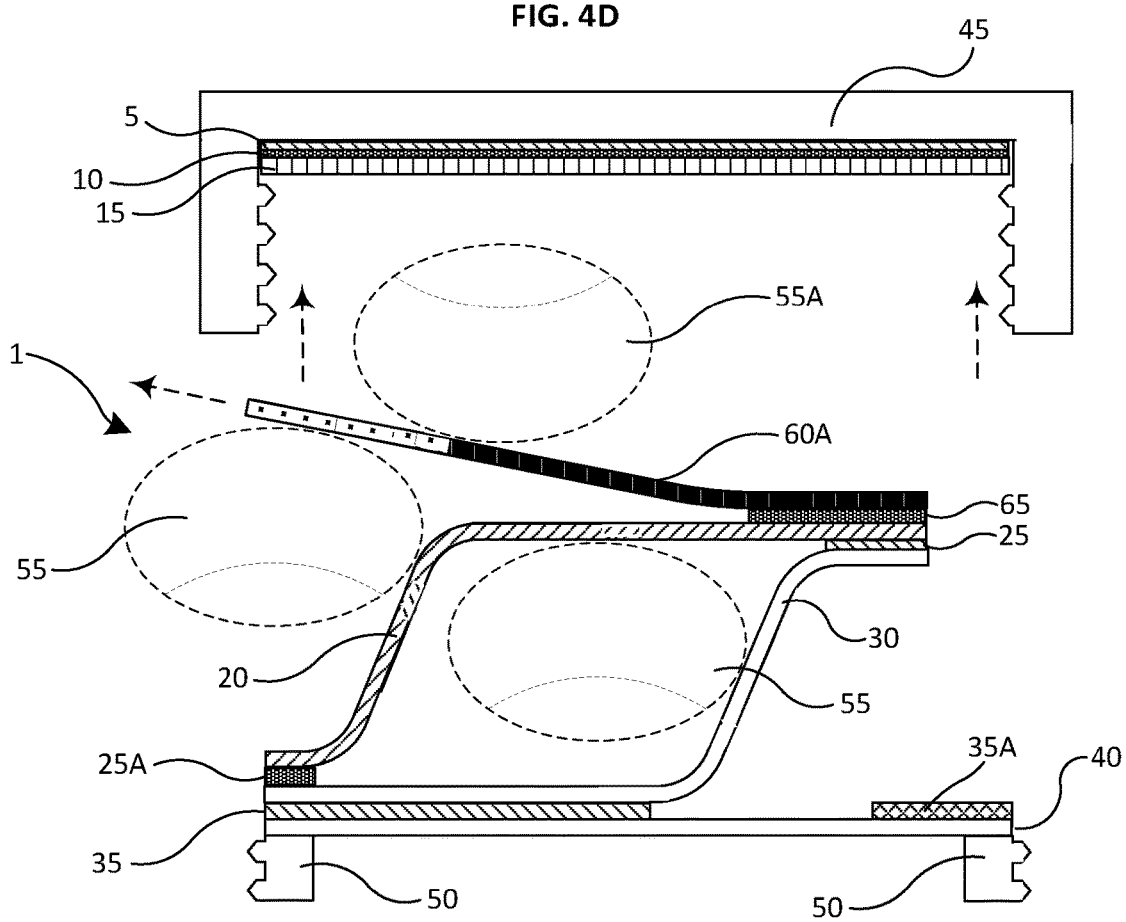
FIG. 4E depicts a third alternative embodiment of the side cross-sectional view of the layers/substrates used for an improved "finger-loop" type tamper-resistant seal, showing typical prior-art substrates disposed in a container cap separated from the container, and showing a typical prior-art sealing substrate disposed at the very top of the container, wherein the improved "finger-loop" type tamper-resistant seal is shown disposed in a completely expanded state while detached from the cap and said "finger loop" being engaged by at least one user finger (an end view of said finger) so a user can exert upper force to detach the seal from the container. This embodiment features an additional upper tab member to aid a user to expand and open-up the "finger loop."
Figure 5A:
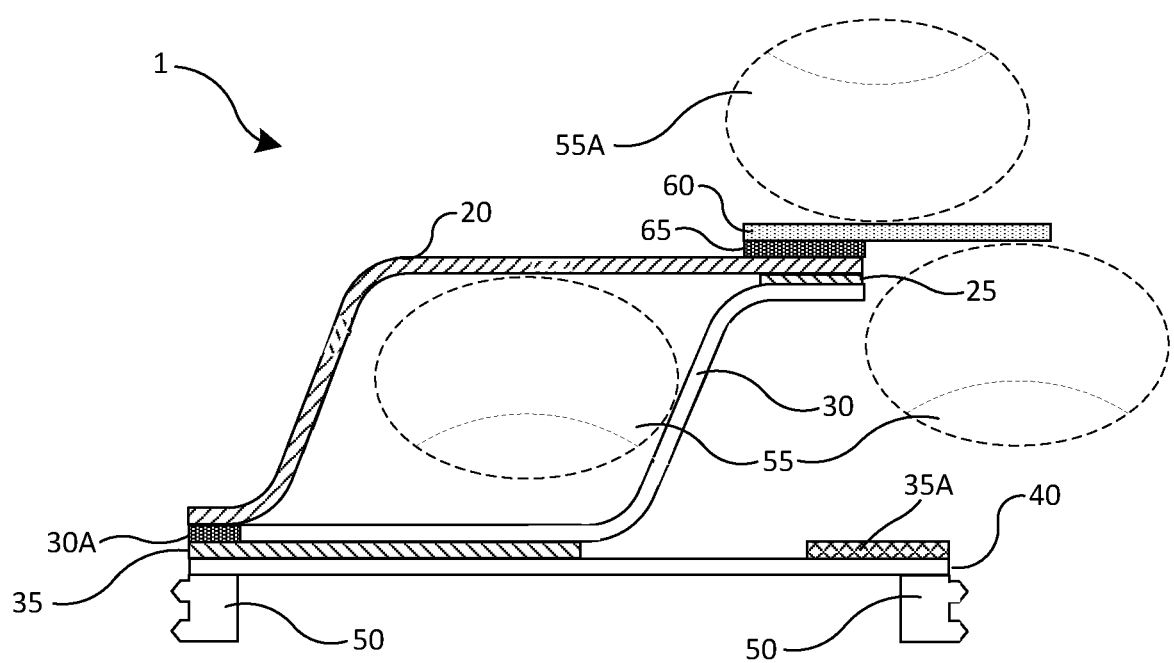
FIG. 5A depicts a fourth alternative embodiment of the side cross-sectional view of the layers/substrates used for an improved "finger-loop" type tamper-resistant seal, showing typical prior-art substrates disposed in a container cap separated from the container, and showing a typical prior-art sealing substrate disposed at the very top of the container, wherein the improved "finger-loop" type tamper-resistant seal is shown disposed in a completely expanded state while detached from the cap and said "finger loop" being engaged by at least one user finger (an end view of said finger) so a user can exert upper force to detach the seal from the container. This embodiment features the variation of an additional substrate forming and upper tab member to aid a user to expand and open-up the "finger loop."
Figure 5B:
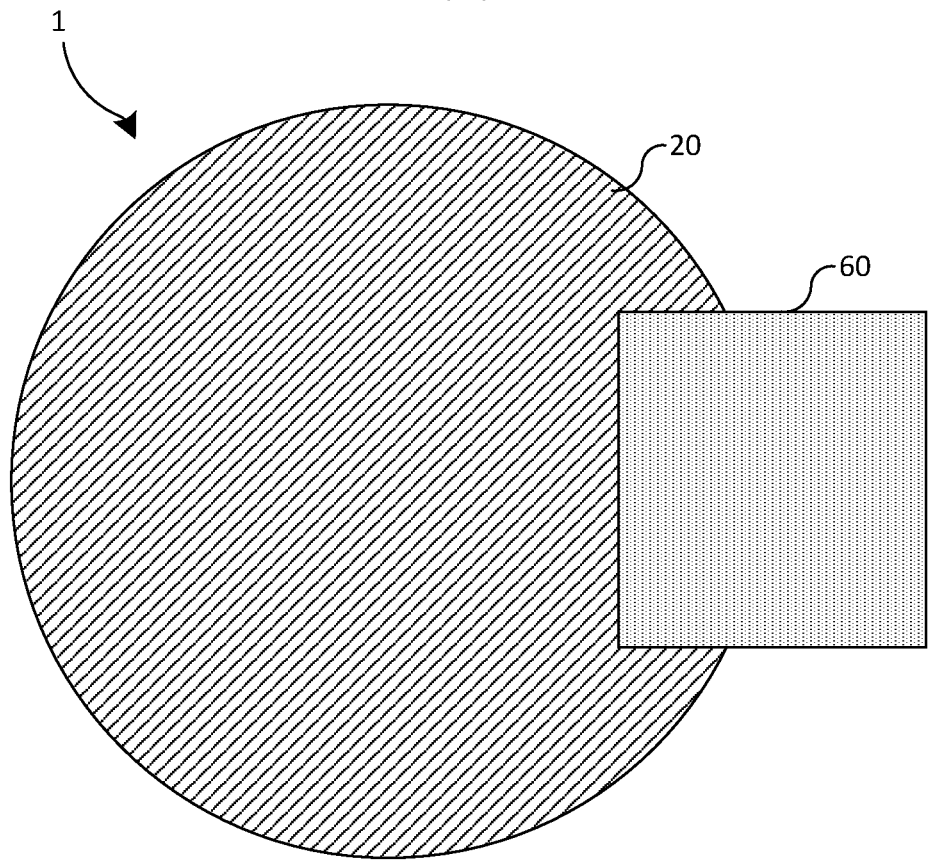
FIG. 5B depicts a fourth alternative embodiment of the top view of the improved "finger-loop" type tamper-resistant seal shown in FIG. 5A, featuring an additional substrate forming an upper tab member to aid a user to expand and open-up the "finger loop." It should be noted that the single upper tab member is exemplary and that in other variations, two or more such tab members can be added radially about the top of the improved "finger-loop" type tamper-resistant seal.

FIGS. 5A and 5B depict a variation on the user-grip-tab embodiment shown in FIGS. 4A through 4B, in that the user-grip tab 60 (that can be gripped with a user's thumb 55A and finger 55) is shorter and oriented in the opposite direction of the user-grip tab 60A shown in the embodiment depicted in FIGS. 4A through 4E. FIG. 5B shows a top view of the user-grip tab 60 affixed to the top of the improved seal-removal assembly 1.

Figure 6A:
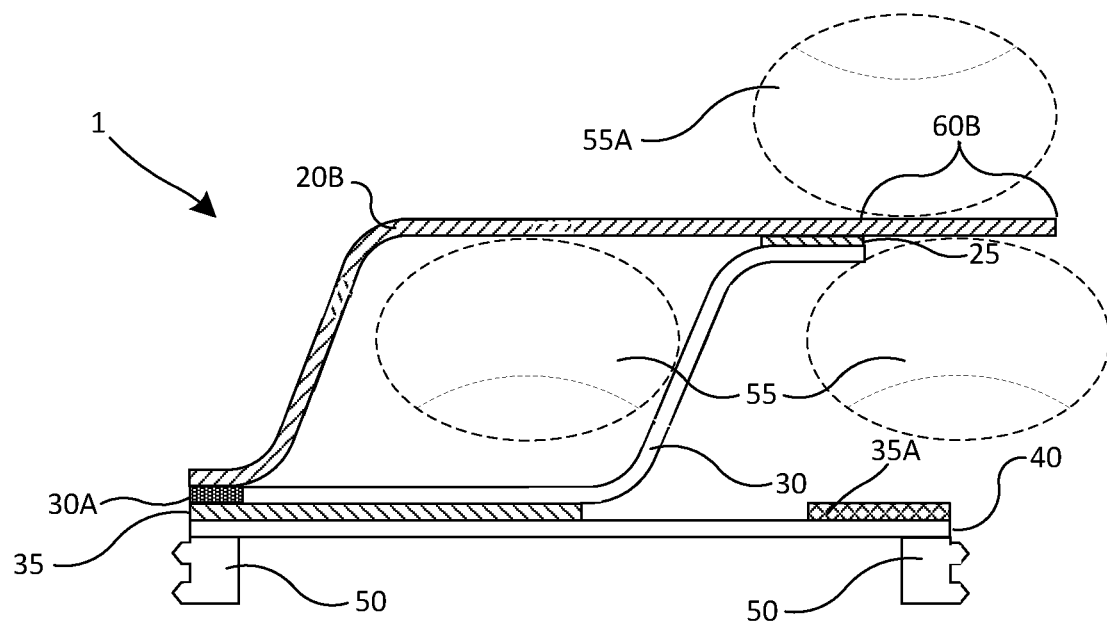
FIG. 6A depicts a fifth alternative embodiment of the side cross-sectional view of the layers/substrates used for an improved "finger-loop" type tamper-resistant seal, showing typical prior-art substrates disposed in a container cap separated from the container, and showing a typical prior-art sealing substrate disposed at the very top of the container, wherein the improved "finger-loop" type tamper-resistant seal is shown disposed in a completely expanded state while detached from the cap and said "finger loop" being engaged by at least one user finger (an end view of said finger) so a user can exert upper force to detach the seal from the container. This embodiment features the variation of an upper tab member extended from and part of the upper substrate of the "finger loop" in order to aid a user to expand and open-up the "finger loop."
Figure 6B:
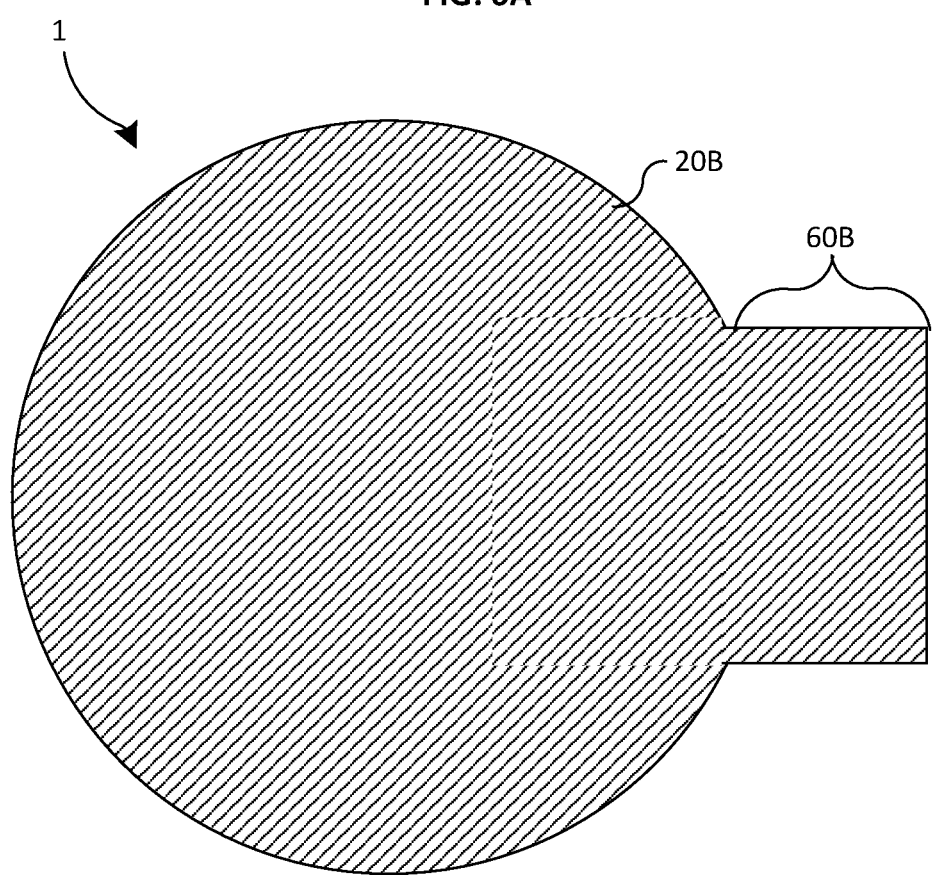
FIG. 6B depicts a fifth alternative embodiment of the top view of the improved "finger-loop" type tamper-resistant seal shown in FIG. 6A, featuring an upper tab member extended from and part of the upper substrate of the "finger loop" in order to aid a user to expand and open-up the "finger loop." It should be noted that the single upper tab member is exemplary and that in other variations, two or more such tab members can be added radially about the upper substrate of the "finger loop" of the improved "finger-loop" type tamper-resistant seal.
Figure 7A:
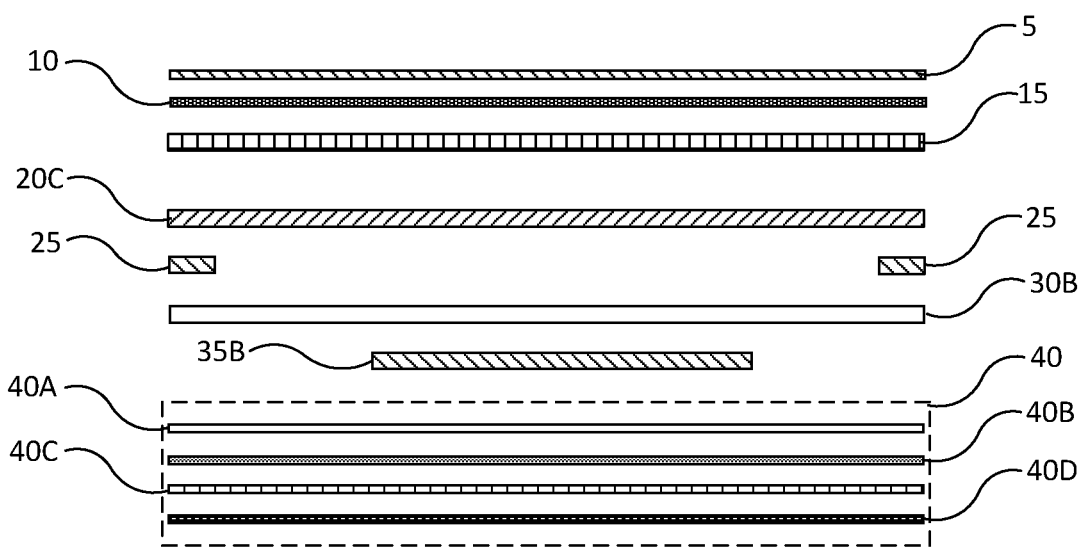
Figure 7B:
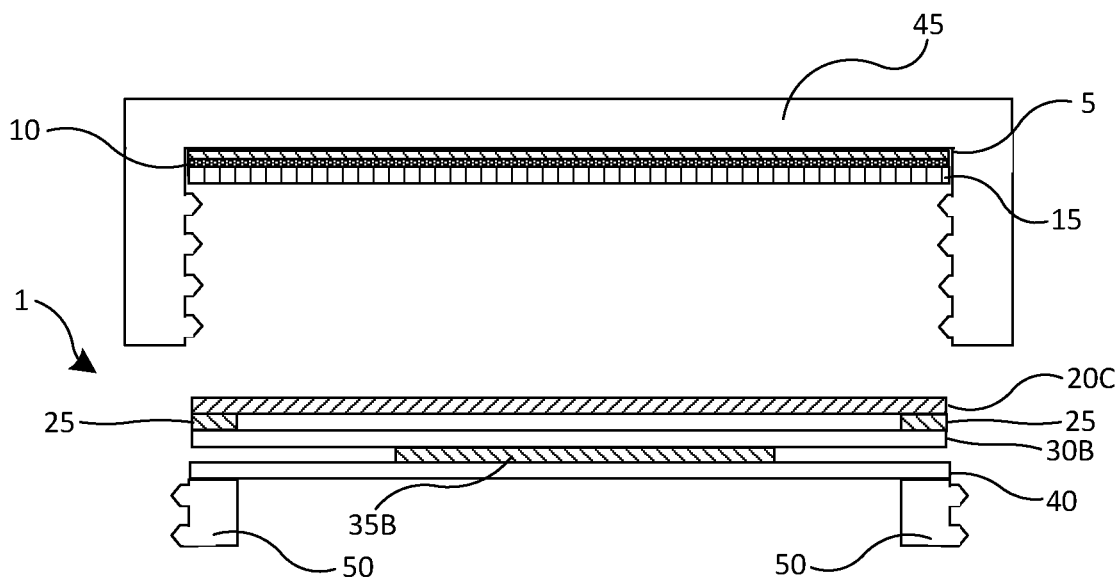
FIG. 7B depicts a sixth alternative embodiment of the side cross-sectional view of the layers/substrates used for an improved "finger-loop" type tamper-resistant seal, showing typical prior-art substrates disposed in a container cap separated from the container, and showing a typical prior-art sealing substrate disposed at the very top of the container, wherein the improved "finger-loop" type tamper-resistant seal is shown disposed in between in a compressed state.
Figure 7C:
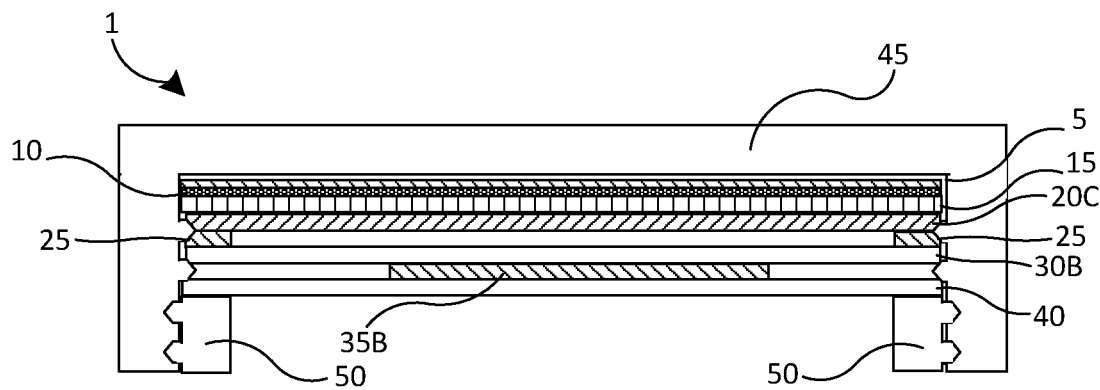
Figure 7D:
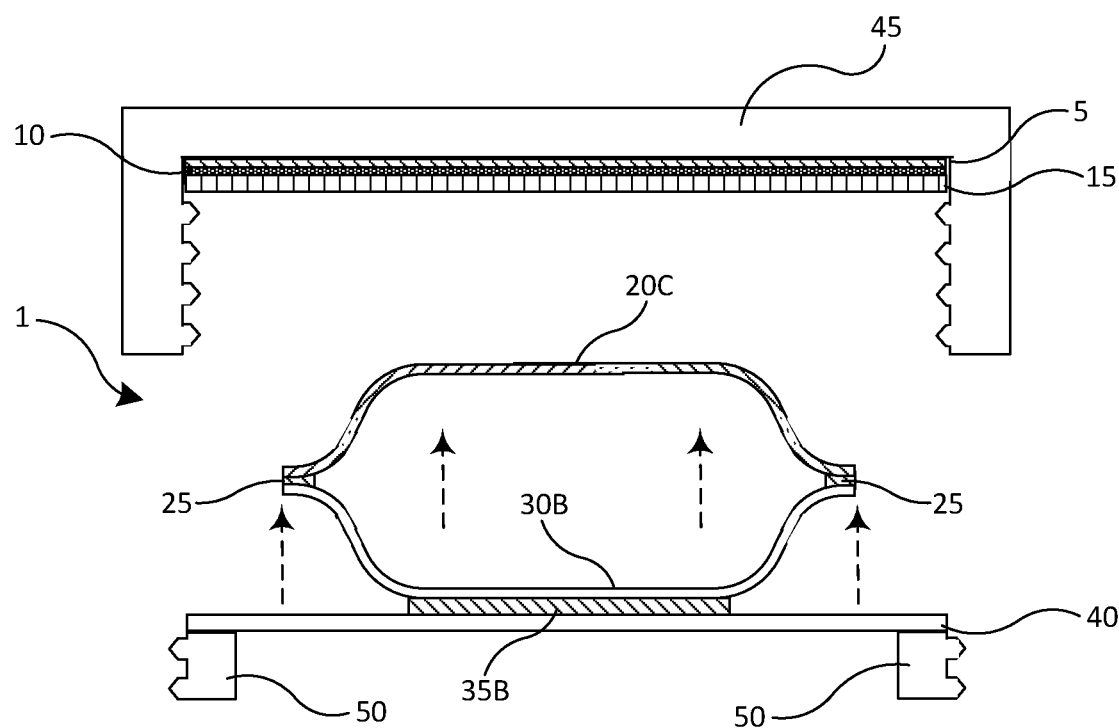
FIG. 7D depicts a sixth alternative embodiment of the side cross-sectional view of the layers/substrates used for an improved "finger-loop" type tamper-resistant seal, showing typical prior-art substrates disposed in a container cap separated from the container, and showing a typical prior-art sealing substrate disposed at the very top of the container, wherein the improved "finger-loop" type tamper-resistant seal is shown disposed in between while still attached to the cap and in a partially expanded state as the cap is removed from the container.
Figure 7E:
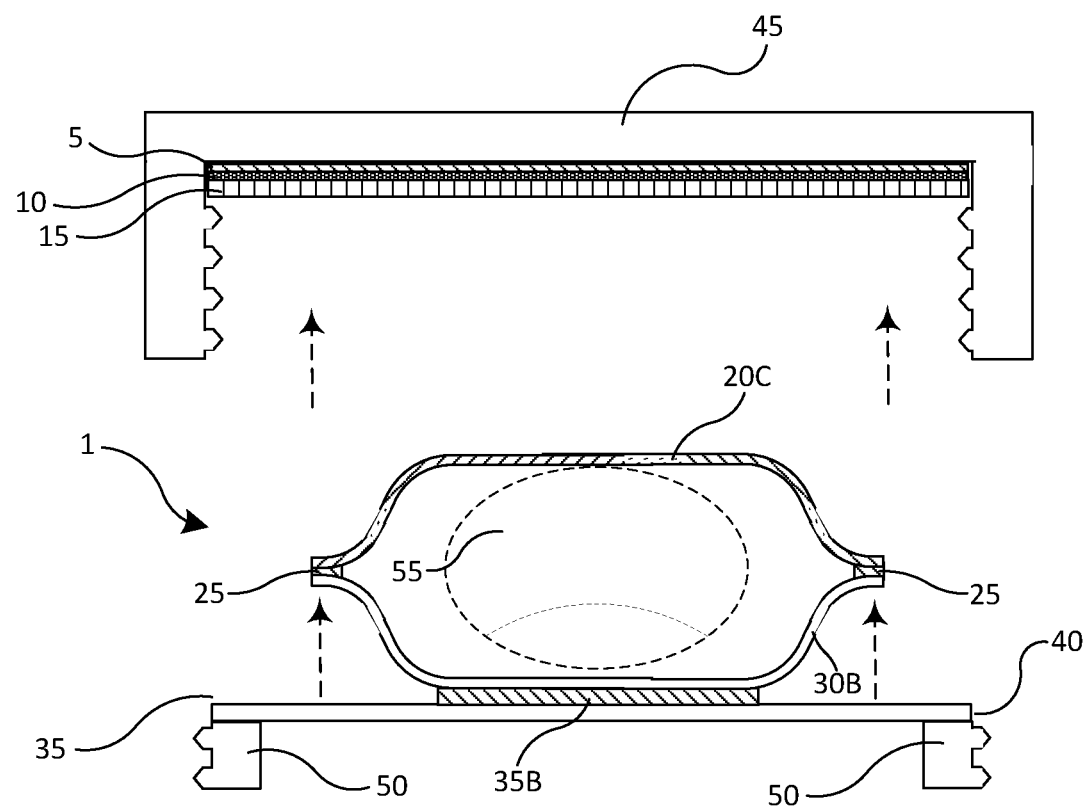
FIG. 7E depicts a sixth alternative embodiment of the side cross-sectional view of the layers/substrates used for an improved "finger-loop" type tamper-resistant seal, showing typical prior-art substrates disposed in a container cap separated from the container, and showing a typical prior-art sealing substrate disposed at the very top of the container, wherein the improved "finger-loop" type tamper-resistant seal is shown disposed in a completely expanded state while detached from the cap and said "finger loop" being engaged by at least one user finger (an end view of said finger) so a user can exert upper force to detach the seal from the container.
Figure 8A:
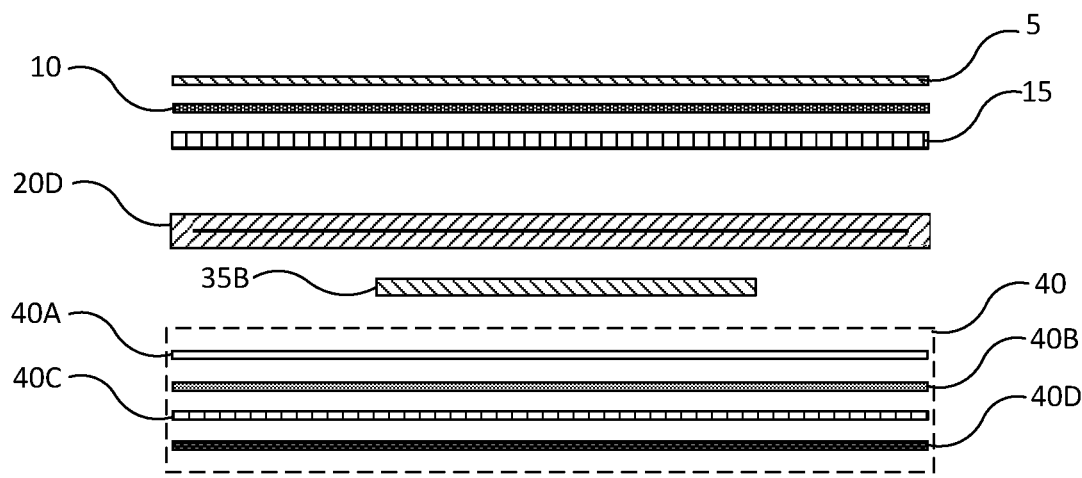
Figure 8B:
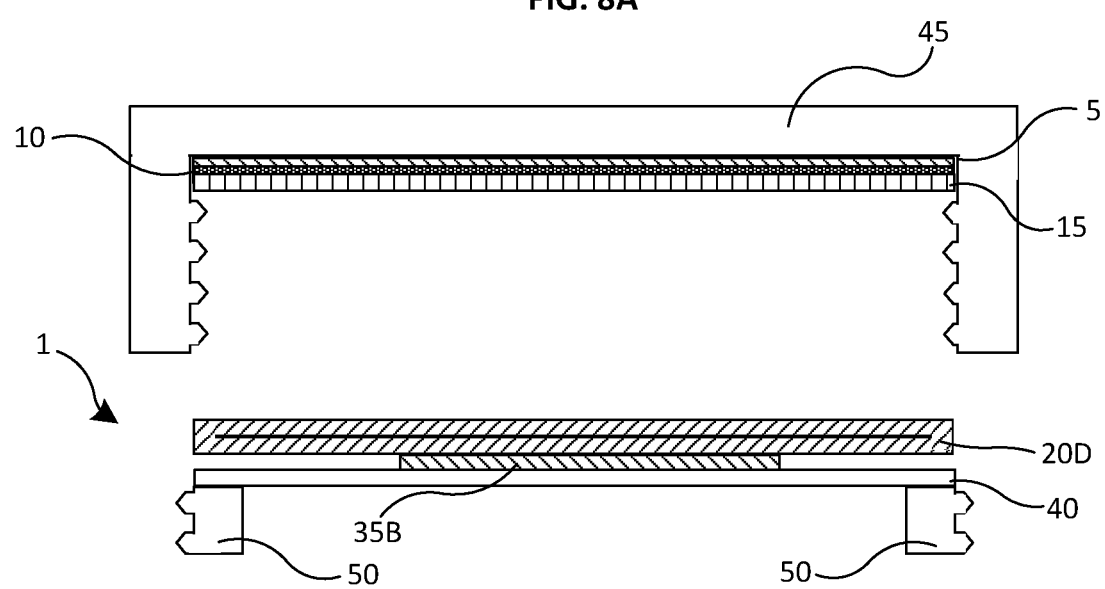
FIG. 8B depicts a seventh alternative embodiment of the side cross-sectional view of the layers/substrates used for an improved "finger-loop" type tamper-resistant seal, showing typical prior-art substrates disposed in a container cap separated from the container, and showing a typical prior-art sealing substrate disposed at the very top of the container, wherein the improved "finger-loop" type tamper-resistant seal is shown disposed in between in a compressed state.
Figure 8C:
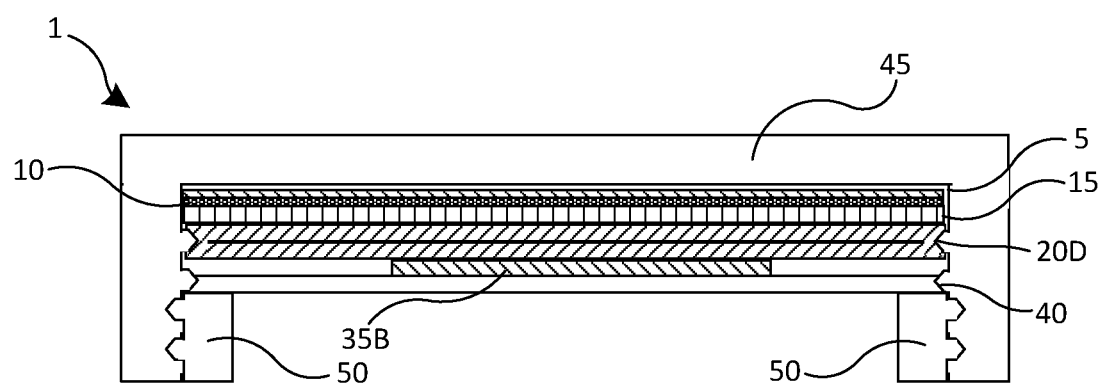
Figure 8D:
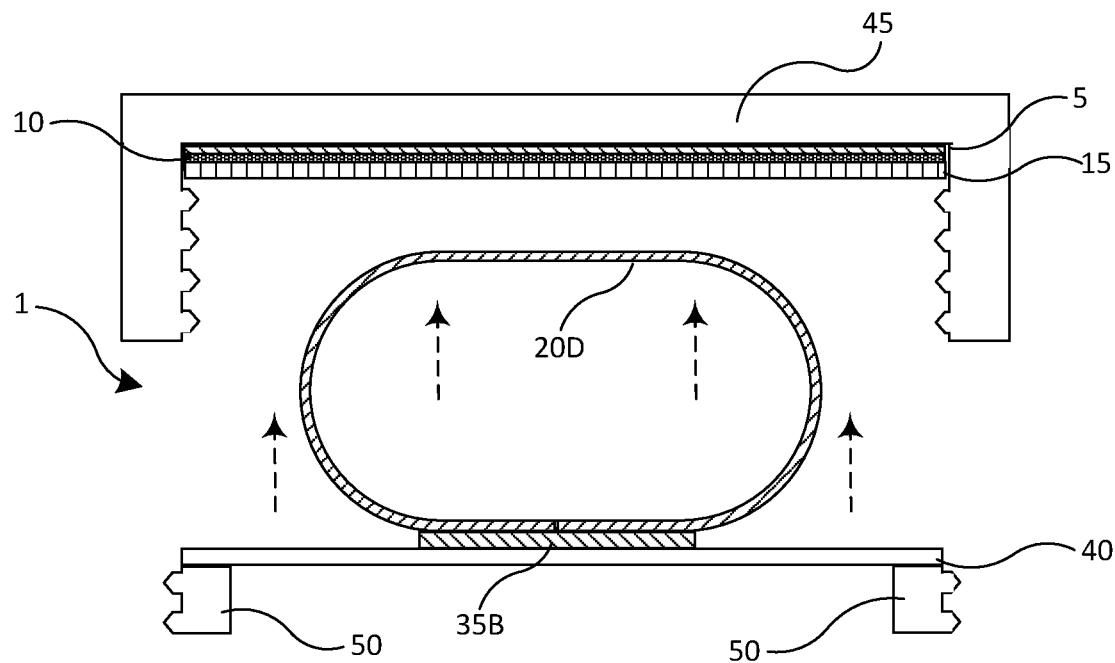
FIG. 8D depicts a seventh alternative embodiment of the side cross-sectional view of the layers/substrates used for an improved "finger-loop" type tamper-resistant seal, showing typical prior-art substrates disposed in a container cap separated from the container, and showing a typical prior-art sealing substrate disposed at the very top of the container, wherein the improved "finger-loop" type tamper-resistant seal is shown disposed in between while still attached to the cap and in a partially expanded state as the cap is removed from the container.
Figure 8E:
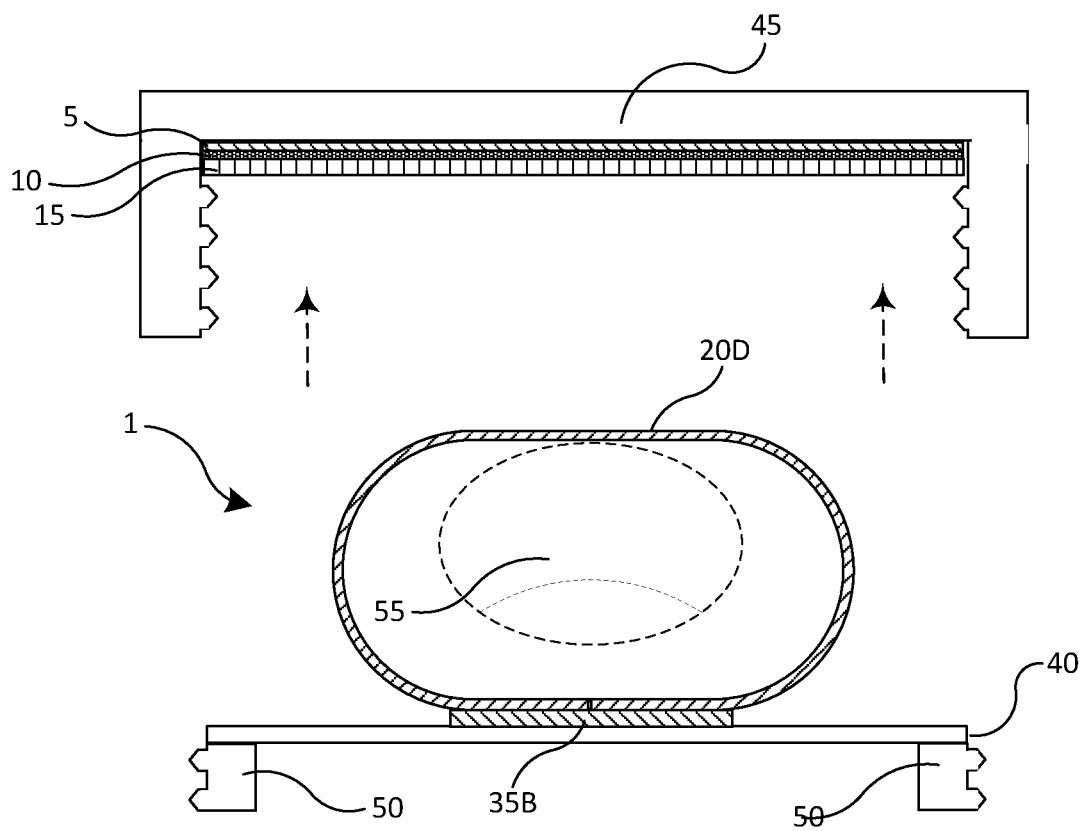
FIG. 8E depicts a seventh alternative embodiment of the side cross-sectional view of the layers/substrates used for an improved "finger-loop" type tamper-resistant seal, showing typical prior-art substrates disposed in a container cap separated from the container, and showing a typical prior-art sealing substrate disposed at the very top of the container, wherein the improved "finger-loop" type tamper-resistant seal is shown disposed in a completely expanded state while detached from the cap and said "finger loop" being engaged by at least one user finger (an end view of said finger) so a user can exert upper force to detach the seal from the container.
Figure 9A:
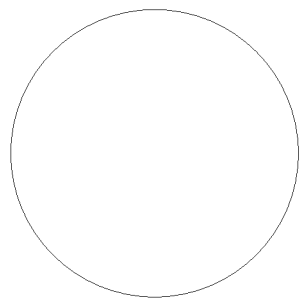
FIGS. 9A through 9H depict six example top-view container form factors (not all-inclusive) that can be used for the improved "finger-loop" type tamper-resistant seal described herein. In addition, these example top-view form factors can be used for the top substrate of the improved "finger-loop" type tamper-resistant seal irrespective of whether to top-view of the container is of the same shape so long as the top substrate is sized to be contained within the form factor of the top of the container.
Figure 9B:
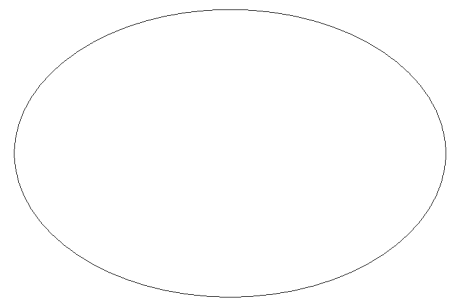
Figure 9C:
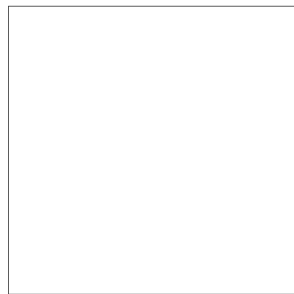
Figure 9D:
Figure 9E:
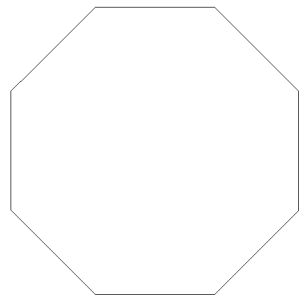
Figure 9F:
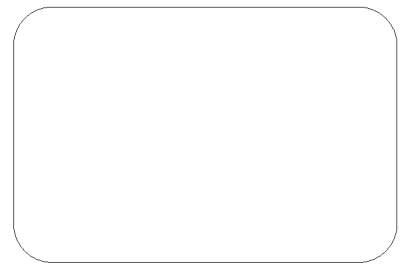
Figure 9G:
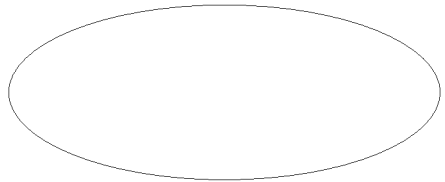
Figure 9H:

FIGS. 6A and 6B depict another variation on the user-grip-tab embodiment shown in FIGS. 4A through 4B, in that the user-grip tab 60B (that can be gripped with a user's thumb 55A and finger 55) is really an extension of the top flexible sheet 20B the improved seal-removal assembly 1 based on the die-cutting of the top flexible sheet 20B during manufacture. The user-grip tab 60B in FIGS. 6A and 6B is shorter and oriented in the opposite direction of the user-grip tab 60A shown in the embodiment depicted in FIGS. 4A through 4E. FIG. 6B shows a top view of the user-grip tab 60 affixed to the top of the improved seal-removal assembly 1.

Persons ordinarily skilled in the art will readily recognize that the user-grip tabs 60, 60A, 60B shown in FIGS. 4A through 6B and described herein can be applied to any of the other embodiments described herein.

In still more embodiments, referring to FIGS. 7A through 7E, the collapsible finger-receiving-aperture sleeve of the improved seal-removal assembly 1 is roughly centered over the container seal 40 and is comprised of a first adhesive layer 35B disposed between the container seal 40 and a bottom flexible sheet 30B. A top flexible sheet 20C of approximately the same size/length of the bottom flexible sheet 30B and the two flexible sheets 20C, 30B are fixedly coupled to each other at two or more points via adhesive layers 25. The two flexible sheets 20C, 30B, when expanded, form a collapsible finger-receiving-aperture sleeve that allows a user to insert a his/her finger 55 (or an elongated tool, such as a writing utensil) and then exert upward force to breach the container seal 40.

In yet another embodiment, referring to FIGS. 8A through 8E, the collapsible finger-receiving-aperture sleeve of the improved seal-removal assembly 1 is roughly centered over the container seal 40 and is comprised of a first adhesive layer 35B disposed between the container seal 40 and a single flexible sheet 20D that is affixed to the first adhesive layer 35B and is configured to form a loop that is large-enough, when expanded, to allow a user to insert a his/her finger 55 (or an elongated tool, such as a writing utensil) and then exert upward force to breach the container seal 40. The single flexible sheet 20D can either be a continuous tube/sleeve, or can be a single sheet securely coupled on its two ends via a heat-activated polymer adhesive such as, e.g., EVA or EMA.

In some variations of the above-described embodiments of the improved seal-removal assembly 1, the top of the improved seal-removal assembly 1 is removably coupled to the bottom surface of the container-cap 45 or to the container-cap layers 5, 10, 15 via a temporary adhesive layer (not shown) that is made from a material having low torsional and low tensile strength. Often, the temporary adhesive used is a "low-tack" type of adhesive, such as the class of adhesives known in the art as "fugitive adhesives." One such candidate temporary adhesive is "3M™ Hot Melt Adhesive 3798 LM," which is a low-melt adhesive that sticks quickly and removes easily. Other similar low-tack adhesives known in the art, such as heat-activated polymer adhesives and wax can be used as well. One advantage of including this temporary adhesive between the improved seal-removal assembly 1 and the container cap 45 is that upon removal of the container cap, the temporary adhesive causes the finger-receiving aperture of the improved seal-removal assembly 1 to open-up.

To use the improved seal-removal assembly 1, the container cap/covering 45 is removed by a user, and the improved seal-removal assembly 1 is expanded to expose the collapsible finger-receiving-aperture sleeve, as described above. A user can insert a finger (or elongated tool, such a writing utensil) into the collapsible finger-receiving-aperture sleeve and pull upward to more-easily exert enough force to breach the container seal 40 and fully pull the container seal 40 off from the container 50. In some embodiments of the improved seal-removal assembly 1 that feature a user-grip tab 60, 60A, 60B, as described above, the collapsible finger-receiving-aperture sleeve can be more-easily expanded by pulling the user-grip tab 60, 60A, 60B upward.

In many variations, the adhesives 25, 25A, 30A, 35, 35B, 65 used in the improved seal-removal assembly 1 are heat-activated polymer adhesives such as EVA or EMA.

In variations, the temporary-release adhesive 35A used is made from a material having low torsional and low tensile strength. Often, the temporary adhesives 35A used is a "low-tack" type of adhesive, such as the class of adhesives known in the art as "fugitive adhesives." One such candidate temporary adhesive is "3M™ Hot Melt Adhesive 3798 LM," which is a low-melt adhesive that sticks quickly and removes easily, making it ideal for the purpose described above. Other similar low-tack adhesives known in the art, such as heat-activated polymer adhesives and wax can be used as well.

In more variations, the flexible sheets and tabs 20, 20A, 20B, 20C, 20D, 30, 30B are typically comprised of a polymer material such as PET, polyester film, nylon, PEN, polypropylene, mylar, and/or other tear-resistant material.

Finally, it should be noted that, although the examples provided in FIGS. 1A through 8E are directed to very typical applications; that is, a threaded container cap 45 commonly found on a jar/bottle 50 holding consumer goods such as prescription medicines, the improved seal-removal assembly 1 as previously discussed above can be applied to just about any container of consumer goods of any shape, regardless of whether the container cap 45 is threaded or fits onto the container 50 via a snap-on lid, interference-fit lid, etc. In addition, those skilled in the art will readily recognize that the improved seal-removal assembly 1 is suitable for applications for container-opening form factors that are of various shapes; that is, not only circular in nature. See, for example, FIGS. 9A through 9H, which depict some potential form factors that could be used (but not an all-inclusive set of examples). Moreover, the shape of the flexible sheets 20, 20A, 20B, 20C, 20D, 30, 30B that make up the collapsible finger-receiving-aperture sleeve in the improved seal-removal assembly 1 does not necessarily have to be of the same shape as the container seal 40 so long as flexible sheets 20, 20A, 20B, 20C, 20D, 30, 30B that make up the collapsible finger-receiving-aperture sleeve are sized to allow a user's finger(s) to be inserted as previously described and that at least one of the flexible sheets 20, 20A, 20B, 20C, 20D, 30, 30B is affixed to a portion of the container seal 40 such that a user can exert leverage to breach the container seal 40. Accordingly, all of the aforementioned applications of the use of the improved seal-removal assembly 1 are contemplated as part of the inventive disclosures herein.

IV. Alternative Embodiments and Other Variations

The various embodiments and variations thereof described herein, including the descriptions in any appended Claims and/or illustrated in the accompanying Figures, are merely exemplary and are not meant to limit the scope of the inventive disclosure. It should be appreciated that numerous variations of the invention have been contemplated as would be obvious to one of ordinary skill in the art with the benefit of this disclosure.

Hence, those ordinarily skilled in the art will have no difficulty devising myriad obvious variations and improvements to the invention, all of which are intended to be encompassed within the scope of the Description, Figures, and Claims herein.

What is claimed is:

1. An improved seal-removal assembly for a container of consumer or commercial goods, said container having a cap for the container's opening and having a container seal, wherein said container seal has an induction-layer that is tamper-evident affixed over the opening of said container, said improved seal-removal assembly comprising:
  a collapsible finger-receiving aperture sleeve comprised of at least one flexible sheet that is fixedly coupled to said container seal on said container opening, wherein:
    said collapsible finger-receiving aperture sleeve can be opened to receive a user finger by expanding said at least one flexible sheet away from said induction layer to form an expanded region partially defined by peripheral edges of said at least one flexible sheet, and said improved seal-removal assembly is sized and adapted to be stowed within said container cap when said container cap is installed over said container-cap opening.

2. The improved seal-removal assembly of claim 1, wherein said collapsible finger-receiving-aperture sleeve is comprised of:
a first tear-resistant flexible sheet having a first end and a second end, with an adhesive layer disposed adjacent to said first end of said first flexible sheet;
a first adhesive layer disposed on a first end of said container seal between said container seal and said first end of said first flexible sheet; and
a second tear-resistant flexible sheet coupled on a first end to said first end of said first flexible sheet and to said adjacent adhesive layer and adhesively coupled on a second end to said second end of said first flexible sheet;
wherein:
the uncoupled region between said first and second flexible sheets is free to be expanded to expose said collapsible finger-receiving-aperture sleeve; and
said collapsible finger-receiving-aperture sleeve is sized to facilitate the insertion of at least one user finger.

3. The improved seal-removal assembly of claim 2, further comprising an additional temporary adhesive layer disposed between said second end of said first flexible sheet and said second end of said container seal in order to aid in the manufacturing process of said improved seal-removal assembly.

4. The improved seal-removal assembly of claim 2, further comprising a user-grip tab coupled to the upper surface of said collapsible finger-receiving aperture sleeve to provide an aid for a user to expand said collapsible finger-receiving aperture sleeve.

5. The improved seal-removal assembly of claim 2, wherein said improved seal-removal assembly is adapted for use on a container of consumer goods, wherein said goods are selected from the group consisting of prescription medicine, vitamins, nutritional supplements, beverages, and foodstuffs.

6. The improved seal-removal assembly of claim 2, wherein said the top-view form factor of said improved seal-removal assembly is selected from the group consisting of circle, oval, square, rectangle, rounded square, rounded rectangle, and octagon.

7. The improved seal-removal assembly of claim 1, wherein said collapsible finger-receiving-aperture sleeve is comprised of:
a first tear-resistant flexible sheet having a first end and a second end;
a first adhesive layer disposed on a first end of said container seal between said container seal and said first end of said flexible bottom sheet;
a second tear-resistant flexible sheet coupled on a first end to said first end of said first flexible sheet via an second adhesive layer, and adhesively coupled on a second end to said second end of said first flexible sheet;
wherein:
the uncoupled region between said first and second flexible sheets is free to be expanded to expose said collapsible finger-receiving-aperture sleeve; and
said collapsible finger-receiving-aperture sleeve is sized to facilitate the insertion of at least one user finger.

8. The improved seal-removal assembly of claim 7, further comprising an additional temporary adhesive layer disposed between said second end of said first flexible sheet and said second end of said container seal in order to aid in the manufacturing process of said improved seal-removal assembly.

9. The improved seal-removal assembly of claim 7, further comprising a user-grip tab coupled to the upper surface of said collapsible finger-receiving aperture sleeve to provide an aid for a user to expand said collapsible finger-receiving aperture sleeve.

10. The improved seal-removal assembly of claim 7, wherein said improved seal-removal assembly is adapted for use on a container of consumer goods, wherein said goods are selected from the group consisting of prescription medicine, vitamins, nutritional supplements, beverages, and foodstuffs.

11. The improved seal-removal assembly of claim 7, wherein said the top-view form factor of said improved seal-removal assembly is selected from the group consisting of circle, oval, square, rectangle, rounded square, rounded rectangle, and octagon.

12. The improved seal-removal assembly of claim 1, wherein said collapsible finger-receiving-aperture sleeve is comprised of:
a tear-resistant flexible sheet having a first end and a second end, with an adhesive layer disposed between said first and second ends of said flexible sheet, wherein said flexible sheet is long-enough to form the collapsible finger-receiving aperture sleeve by itself when expanded from a stowed position on top of said container seal;
a first adhesive layer disposed on a first end of said container seal between said container seal and said first end of said flexible sheet; and
wherein:
the uncoupled region within said flexible sheet is free to be expanded to expose said collapsible finger-receiving-aperture sleeve; and
said collapsible finger-receiving-aperture sleeve is sized to facilitate the insertion of at least one user finger.

13. The improved seal-removal assembly of claim 12, further comprising an additional temporary adhesive layer disposed between said flexible sheet and said second end of said container seal in order to aid in the manufacturing process of said improved seal-removal assembly.

14. The improved seal-removal assembly of claim 12, further comprising a user-grip tab coupled to the upper surface of said collapsible finger-receiving aperture sleeve to provide an aid for a user to expand said collapsible finger-receiving aperture sleeve.

15. The improved seal-removal assembly of claim 12, wherein said improved seal-removal assembly is adapted for use on a container of consumer goods, wherein said goods are selected from the group consisting of prescription medicine, vitamins, nutritional supplements, beverages, and foodstuffs.

16. The improved seal-removal assembly of claim 12, wherein said the top-view form factor of said improved seal-removal assembly is selected from the group consisting of circle, oval, square, rectangle, rounded square, rounded rectangle, and octagon.

17. The improved seal-removal assembly of claim 1, wherein said collapsible finger-receiving-aperture sleeve is comprised of:
a first tear-resistant flexible sheet having a first end and a second end;

a second tear-resistant flexible sheet, having a first end and a second end, adhesively coupled on its first end to said first end of said first flexible sheet and adhesively coupled on its second end to said second end of said first flexible sheet;

an adhesive layer disposed between said container seal and said first end of said first flexible sheet; and wherein:

the uncoupled region between said first and second flexible sheets is free to be expanded to expose said collapsible finger-receiving-aperture sleeve; and said collapsible finger-receiving-aperture sleeve is sized to facilitate the insertion of at least one user finger.

18. The improved seal-removal assembly of claim 17, further comprising a user-grip tab coupled to the upper surface of said collapsible finger-receiving aperture sleeve to provide an aid for a user to expand said collapsible finger-receiving aperture sleeve.

19. The improved seal-removal assembly of claim 17, wherein said improved seal-removal assembly is adapted for use on a container of consumer goods, wherein said goods are selected from the group consisting of prescription medicine, vitamins, nutritional supplements, beverages, and foodstuffs.

20. The improved seal-removal assembly of claim 17, wherein said the top-view form factor of said improved seal-removal assembly is selected from the group consisting of circle, oval, square, rectangle, rounded square, rounded rectangle, and octagon.

21. The improved seal-removal assembly of claim 1, wherein said collapsible finger-receiving-aperture sleeve is comprised of:

a tear-resistant flexible sheet having a first end and a second end, said flexible sheet being long-enough to form the collapsible finger-receiving aperture sleeve by itself when expanded from a stowed position on top of said container seal;

an adhesive layer disposed between said container seal and the bottom of said flexible sheet, at first and second ends of said flexible sheet, in order to form said collapsible finger-receiving aperture sleeve; and wherein said collapsible finger-receiving-aperture sleeve is sized to facilitate the insertion of at least one user finger.

22. The improved seal-removal assembly of claim 21, further comprising a user-grip tab coupled to the upper surface of said collapsible finger-receiving aperture sleeve to provide an aid for a user to expand said collapsible finger-receiving aperture sleeve.

23. The improved seal-removal assembly of claim 21, wherein said improved seal-removal assembly is adapted for use on a container of consumer goods, wherein said goods are selected from the group consisting of prescription medicine, vitamins, nutritional supplements, beverages, and foodstuffs.

24. The improved seal-removal assembly of claim 21, wherein said the top-view form factor of said improved seal-removal assembly is selected from the group consisting of circle, oval, square, rectangle, rounded square, rounded rectangle, and octagon.

25. An improved container of consumer goods, said container having an induction-layer, tamper-evident container seal ("container seal") affixed over the opening of said container that features an improved seal-removal assembly of claim 1.

26. The improved container of consumer goods of claim 25, further comprising a container cap within which said improved seal-removal assembly is adapted to be fit within said container cap.

27. The improved container of consumer goods of claim 25, wherein said improved container of consumer goods contains goods selected from the group consisting of prescription medicine, vitamins, nutritional supplements, beverages, and foodstuffs.

28. The improved container of consumer goods of claim 25, wherein said the top-view form factor of said improved seal-removal assembly is selected from the group consisting of circle, oval, square, rectangle, rounded square, rounded rectangle, and octagon.

29. The improved container of consumer goods of claim 25, wherein said the top-view form factor of the opening of said improved container of consumer goods is selected from the group consisting of circle, oval, square, rectangle, rounded square, rounded rectangle, and octagon.

* * * * *